Nov. 19, 1963 F. S. FARKAS 3,111,624
AUTOMATIC SYSTEM FOR SELECTIVELY SUBSTITUTING SPARE CHANNELS
FOR FAILED WORKING CHANNELS IN A MULTICHANNEL
MULTILINK COMMUNICATION SYSTEM
Filed Jan. 4, 1960 16 Sheets-Sheet 1

INVENTOR
F.S. FARKAS
BY
[signature]
ATTORNEY

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Filed Jan. 4, 1960

INVENTOR
F. S. FARKAS
BY [signature]
ATTORNEY

Nov. 19, 1963 F. S. FARKAS 3,111,624

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Filed Jan. 4, 1960 16 Sheets-Sheet 3

INVENTOR
F. S. FARKAS
BY [signature]
ATTORNEY

INVENTOR
F. S. FARKAS
BY [signature]
ATTORNEY

INVENTOR
F. S. FARKAS
BY [signature]
ATTORNEY

Nov. 19, 1963 F. S. FARKAS 3,111,624

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Filed Jan. 4, 1960

16 Sheets-Sheet 6

INVENTOR
F. S. FARKAS
BY
ATTORNEY

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Filed Jan. 4, 1960 16 Sheets-Sheet 7

INVENTOR
F. S. FARKAS
BY [signature]
ATTORNEY

Nov. 19, 1963 F. S. FARKAS 3,111,624

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Filed Jan. 4, 1960

16 Sheets-Sheet 8

INVENTOR
F. S. FARKAS
BY [signature]
ATTORNEY

INVENTOR
F. S. FARKAS
BY [signature]
ATTORNEY

INVENTOR
F. S. FARKAS
BY [signature]
ATTORNEY

INVENTOR
F. S. FARKAS
BY [signature]
ATTORNEY

INVENTOR
F. S. FARKAS
BY [signature]
ATTORNEY

Nov. 19, 1963 F. S. FARKAS 3,111,624
AUTOMATIC SYSTEM FOR SELECTIVELY SUBSTITUTING SPARE CHANNELS
FOR FAILED WORKING CHANNELS IN A MULTICHANNEL
MULTILINK COMMUNICATION SYSTEM
Filed Jan. 4, 1960 16 Sheets-Sheet 13

INVENTOR
F. S. FARKAS
BY [signature]
ATTORNEY

FIG. 14

| CASE | CONDITION OF OPERATION OF THE SWITCHING SYSTEM |
|---|---|
| 1. | WORKING CHANNELS, PROTECTION CHANNELS, AND AUXILIARY CIRCUIT FUNCTIONING PROPERLY. |
| 2. | WORKING CHANNELS AND PROTECTION CHANNELS FUNCTIONING PROPERLY. AUXILIARY CIRCUIT MALFUNCTIONS REMOVING ALL STATUS TONES. |
| 3. | WORKING CHANNEL 1 REQUESTS A SWITCH. ALL OTHER CHANNELS FUNCTIONING PROPERLY. |
| 4. | WORKING CHANNEL 1 SWITCHED. AUXILIARY CIRCUIT MALFUNCTIONS REMOVING ALL STATUS TONES. |
| 5. | WORKING CHANNEL 1 SWITCHED. AUXILIARY CIRCUIT FUNCTIONING PROPERLY RETURNING ALL STATUS TONES EXCEPT WORKING CHANNEL 1. |
| 6. | WORKING CHANNEL 1 SWITCHED. WORKING CHANNEL 6 REQUESTS A SWITCH. |
| 7. | WORKING CHANNELS 1 AND 6 SWITCHED TO PROTECTION CHANNELS 7 AND 8, RESPECTIVELY. LOSS OF ALL STATUS TONES. |
| 8. | WORKING CHANNEL 1 REQUESTS SWITCH RELEASE. WORKING CHANNEL 6 REMAINS SWITCHED TO PROTECTION CHANNEL 8. |
| 8a. | PROTECTION CHANNEL 7 STATUS TONE MOMENTARILY REMOVED. |
| 9. | WORKING CHANNEL 6 REQUESTS SWITCH RELEASE. |
| 9a. | PROTECTION CHANNEL 8 STATUS TONE MOMENTARILY REMOVED. |
| 10. | RETURN OF SYSTEM TO CASE 1. |
| 11. | WORKING CHANNEL 1 REQUESTS A SWITCH. PROTECTION CHANNEL 7 NOT FUNCTIONING PROPERLY. |
| 12. | WORKING CHANNEL 2 SWITCHED TO PROTECTION CHANNEL 7. WORKING CHANNEL 1 REQUESTS A SWITCH. |

INVENTOR
F. S. FARKAS
BY [signature]
ATTORNEY

FIG. 15

| A1 | A6 | A7 | A8 | B | C1 | C6 | D | E7 | E8 | F1 | F6 | G1 | G6 | H1 | H6 | J1 | J6 | K1 | K6 | L | M1 | M2 | M3 | M6 | N1 | N2 | N3 | N6 |
|---|---|---|---|---|---|---|---|---|---|---|---|---|---|---|---|---|---|---|---|---|---|---|---|---|---|---|---|---|
| 0 | 0 | 1 | 1 | 1 | 1 | 1 | 1 | 1 | 1 | 0 | 0 | 0 | 0 | 0 | 0 | 1 | 1 | 0 | 0 | 0 | 0 | 0 | 0 | 0 | 0 | 0 | 0 | 0 |
| 1 | 1 | 0 | 0 | 0 | 1 | 1 | 1 | 0 | 0 | 0 | 0 | 0 | 0 | 0 | 0 | 1 | 1 | 0 | 0 | 0 | 0 | 0 | 0 | 0 | 0 | 0 | 0 | 0 |
| 1 | 0 | 1 | 1 | 1 | 0 | 1 | 1 | 1 | 1 | 1 | 0 | 1 | 0 | 1 | 0 | 0 | 1 | 0 | 0 | 0 | 1 | 0 | 0 | 0 | 0 | 0 | 0 | 0 |
| 1 | 1 | 0 | 0 | 0 | 1 | 1 | 1 | 0 | 0 | 0 | 0 | 0 | 0 | 1 | 0 | 0 | 1 | 0 | 0 | 0 | 0 | 0 | 0 | 0 | 0 | 0 | 0 | 0 |
| 1 | 0 | 1 | 1 | 1 | 0 | 1 | 1 | 1 | 1 | 1 | 0 | 1 | 0 | 1 | 0 | 0 | 1 | 0 | 0 | 0 | 1 | 0 | 0 | 0 | 0 | 0 | 0 | 0 |
| 1 | 1 | 1 | 1 | 1 | 0 | 0 | 1 | 1 | 1 | 1 | 1 | 1 | 1 | 1 | 1 | 0 | 0 | 0 | 0 | 0 | 1 | 0 | 0 | 1 | 0 | 0 | 0 | 0 |
| 1 | 1 | 0 | 0 | 0 | 1 | 1 | 1 | 0 | 0 | 0 | 0 | 0 | 0 | 1 | 1 | 0 | 0 | 0 | 0 | 0 | 0 | 0 | 0 | 0 | 0 | 0 | 0 | 0 |
| 0 | 1 | 1 | 1 | 1 | 1 | 0 | 1 | 1 | 1 | 0 | 1 | 0 | 1 | 1 | 1 | 0 | 0 | 1 | 0 | 1 | 0 | 0 | 0 | 1 | 0 | 0 | 0 | 0 |
| 0 | 1 | 0 | 1 | 0 | 0 | 1 | 0 | 1 | 1 | 0 | 1 | 0 | 1 | 0 | 1 | 1 | 0 | 0 | 0 | 0 | 0 | 0 | 0 | 1 | 0 | 0 | 0 | 0 |
| 0 | 0 | 1 | 1 | 1 | 1 | 1 | 1 | 1 | 1 | 0 | 0 | 0 | 0 | 0 | 1 | 1 | 0 | 0 | 1 | 1 | 0 | 0 | 0 | 0 | 0 | 0 | 0 | 0 |
| 0 | 0 | 1 | 0 | 0 | 0 | 0 | 0 | 1 | 1 | 0 | 0 | 0 | 0 | 0 | 0 | 1 | 1 | 0 | 0 | 0 | 0 | 0 | 0 | 0 | 0 | 0 | 0 | 0 |
| 0 | 0 | 1 | 1 | 1 | 1 | 1 | 1 | 1 | 1 | 0 | 0 | 0 | 0 | 0 | 0 | 1 | 1 | 0 | 0 | 0 | 0 | 0 | 0 | 0 | 0 | 0 | 0 | 0 |
| 1 | 0 | 0 | 1 | 0 | 1 | 0 | 0 | 1 | 1 | 1 | 0 | 1 | 0 | 1 | 0 | 0 | 1 | 0 | 0 | 0 | 0 | 0 | 0 | 0 | 1 | 0 | 0 | 0 |
| 1 | 0 | 1 | 1 | 1 | 0 | 1 | 1 | 1 | 1 | 1 | 0 | 1 | 0 | 1 | 0 | 0 | 1 | 0 | 0 | 0 | 0 | 1 | 0 | 0 | 1 | 0 | 0 | 0 |

INVENTOR
F. S. FARKAS
BY [signature]
ATTORNEY

FIG. 16

| TRANSMITTER SWITCH | RECEIVER SWITCH |
|---|---|
| NO SWITCHES MADE. | NO SWITCHES MADE. |
| NO SWITCHES MADE. | NO SWITCHES MADE. |
| WORKING CHANNEL 1 SWITCHED TO PROTECTION CHANNEL 7. | WORKING CHANNEL 1 SWITCHED TO PROTECTION CHANNEL 7. |
| WORKING CHANNEL 1 SWITCH HELD BY ACTION OF SWITCH HOLD CIRCUIT. | WORKING CHANNEL 1 SWITCH HELD BY ACTION OF SWITCH HOLD CIRCUIT. |
| WORKING CHANNEL 1 SWITCH HELD BY SWITCH REQUEST SIGNAL. | WORKING CHANNEL 1 SWITCH HELD BY SWITCH REQUEST SIGNAL. |
| WORKING CHANNEL 1 SWITCHED TO CHANNEL 7. WORKING CHANNEL 6 SWITCHED TO CHANNEL 8. | WORKING CHANNEL 1 SWITCHED TO CHANNEL 7. WORKING CHANNEL 6 SWITCHED TO CHANNEL 8. |
| WORKING CHANNELS 1 AND 6 SWITCHES HELD BY ACTION OF SWITCH HOLD CIRCUITS. | WORKING CHANNELS 1 AND 6 SWITCHES HELD BY ACTION OF SWITCH HOLD CIRCUITS. |
| WORKING CHANNELS 1 AND 6 SWITCHED TO CHANNELS 7 AND 8, RESPECTIVELY. CHANNEL 1 SWITCH HELD BY ACTION OF SWITCH HOLD CIRCUIT. | WORKING CHANNEL 6 SWITCH HELD BY SWITCH REQUEST SIGNAL. WORKING CHANNEL 1 SWITCH RELEASED. |
| WORKING CHANNEL 6 SWITCH REMAINS. WORKING CHANNEL 1 SWITCH RELEASED. | WORKING CHANNEL 6 SWITCH HELD BY SWITCH REQUEST SIGNAL. |
| WORKING CHANNEL 6 SWITCH HELD BY ACTION OF SWITCH HOLD CIRCUIT. | WORKING CHANNEL 6 SWITCH RELEASED. |
| WORKING CHANNEL 6 SWITCH RELEASED. | NO SWITCHES MADE. |
| NO SWITCHES MADE. | NO SWITCHES MADE. |
| WORKING CHANNEL 1 SWITCHED TO PROTECTION CHANNEL 8. | WORKING CHANNEL 1 SWITCHED TO PROTECTION CHANNEL 8. |
| WORKING CHANNEL 2 SWITCHED TO CHANNEL 7. WORKING CHANNEL 1 SWITCHED TO CHANNEL 8 | WORKING CHANNEL 2 SWITCHED TO CHANNEL 7. WORKING CHANNEL 1 SWITCHED TO CHANNEL 8. |

INVENTOR
F. S. FARKAS
BY [signature]
ATTORNEY 3,111,624

AUTOMATIC SYSTEM FOR SELECTIVELY SUBSTITUTING SPARE CHANNELS FOR FAILED WORKING CHANNELS IN A MULTICHANNEL MULTILINK COMMUNICATION SYSTEM

Francis S. Farkas, Wantagh, N.Y., assignor to Bell Telephone Laboratories, Incorporated, New York, N.Y., a corporation of New York Filed Jan. 4, 1960, Ser. No. 344
14 Claims. (Cl. 325—2)

This invention relates to automatic switching systems for multi-channel, multi-link communication systems and more particularly to a flexible system wherein any one of a plurality of working facilities of such a system are replaceable by any one of a plurality of spare facilities in the event of transmission failure of a working facility in one or more links of the multi-link system.

In multi-link communication systems involving terminal stations and several repeater stations, failure or significant degradation in transmission in any interstation link disables the entire system. Where such systems are employed for the transmission of information in digital form or for the transmission of television signals or multiplex message signals, such a failure assumes serious proportions and the provision of spare facilities becomes economically justified.

A typical radio relay system having one spare facility and devices for automatically substituting this spare facility for any one of a plurality of working facilities is disclosed in United States Patent 2,733,296, granted J. B. Maggio on January 31, 1956. The system therein described contemplates the transmission of tones over the working facility for the monitoring thereof to determine the necessity of a substitution. When information, such as telephone switching signals, teletypewriter signals or computer data, is transmitted in digital form over the working channels, tones of the type used in the system of the above-identified patent cannot be used because of the possibility of interference.

When there are a number of working channels and each channel is carrying television signals or multiplex message signals, it is desirable to provide protection of greater reliability than previously provided. One way of providing this greater reliability and protection is to use a spare channel with each individual working channel and means for automatically substituting the spare channel for its working channel upon failure thereof.

In a multi-channel system, the provision of a spare channel for each working channel (commonly called a one-for-one system) becomes very difficult because of the large number of components required at the terminal stations and the fact that each spare channel requires a frequency band as broad as that of the working channel which further congests the frequency spectrum at the radio frequencies.

Therefore, it is desirable to provide an automatic switching system that provides a plurality of spare facilities, any of which can be substituted for any one of a plurality of working channels. Such a system will therefore require fewer spare facilities to protect a large number of working facilities than a system where each working facility has its own spare facility.

A system having a plurality of spare facilities capable of being substituted for any one of the working facilities will give substantially as reliable a service as will a one-for-one system in general and in some cases will give better reliability and service. For example, if a spare facility fails after substitution, another spare may be substituted therefor. While such a system is of advantage in general in any multi-link communication system, it is of particular advantage when used in conjunction with microwave radio relay systems of the type employed for transcontinental transmissions of multiplex digital, telephone, and television signals and specifically with the type described in the article entitled "6,000-Megacycle-Per-Second Radio Relay System for Broad-Band Long-Haul Service in the Bell System," by M. B. McDavitt in the American Institute of Electrical Engineers Transactions, vol. 76, Part 1, starting at page 715.

In the radio relay system described in the McDavitt article, a one-way system is built up of sections each including a radio transmitting terminal, a radio receiving terminal and several intermediate radio repeaters. The message waves which fall in the video frequency band are applied to frequency-modulation equipment at the transmitting terminal to modulate a 74 megacycle-per-second (intermediate-frequency) carrier. This carrier is heterodyned up to a frequency of the order of 6,000 megacycles-per-second for microwave radio transmission. At radio repeater points the received wave is reduced to the intermediate frequency, amplified at that frequency and then increased again to a microwave radio frequency for retransmission. Ultimately, the modulated signal is recovered at the receiving terminal and is demodulated to recover the message intelligence. Interruptions of transmission over such a system can be caused by equipment failure or by fading which results from varying atmospheric conditions.

It is convenient in the application of automatic protection switching to such a system to isolate for switching purposes, switching sections including either a terminal station, a number of intermediate repeater stations and a so-called main station, which comprises a repeater station provided with switching equipment, or two main or terminal stations and the repeater stations therebetween. In either case, the problem contemplated by the invention involves the compatibility and interchangeability of a system having only one spare facility and a system having a plurality of spare facilities, the recognition at advantageous points along the transmission route of the failure of a prior section of a working facility, and the substitution of a spare facility for this section within as short a time as possible.

In accordance with the invention, therefore, an automatic switching system is provided for a communication system which includes transmitting and receiving stations, a plurality of working channels linking these stations through intermediate repeater stations and a plurality of spare or protection channels also linking these stations and an auxiliary circuit including means for effecting a substitution of a spare channel upon the transmission failure of a working channel.

The automatic switching system includes switches at the transmitter and receiver terminals for substituting any one of the protection channels for any one of the working channels that might fail, channel monitors bridged across the transmission circuits for originating switch and restoral requests in accordance with the condition of its particular channel, and an auxiliary circuit associated with the communication system and composed of reporter circuits coupled to the channel monitors at each location for accepting the signals from the channel monitors and processing them as to channel and condition for transmission to the switch control, a transmitter switch control at the transmitter terminal for controlling the switching action of the switches at the transmitter and receiver terminals, a receiver switch control at the receiver terminal for accepting signals from the transmitter switch control and effecting the switching action of the receiver switch, and means for carrying the information between the component circuits of the auxiliary circuit.

These and other features and advantages of the invention will appear more clearly and fully upon consideration of the following specification taken in connection with the drawing in which.

Figure 11:
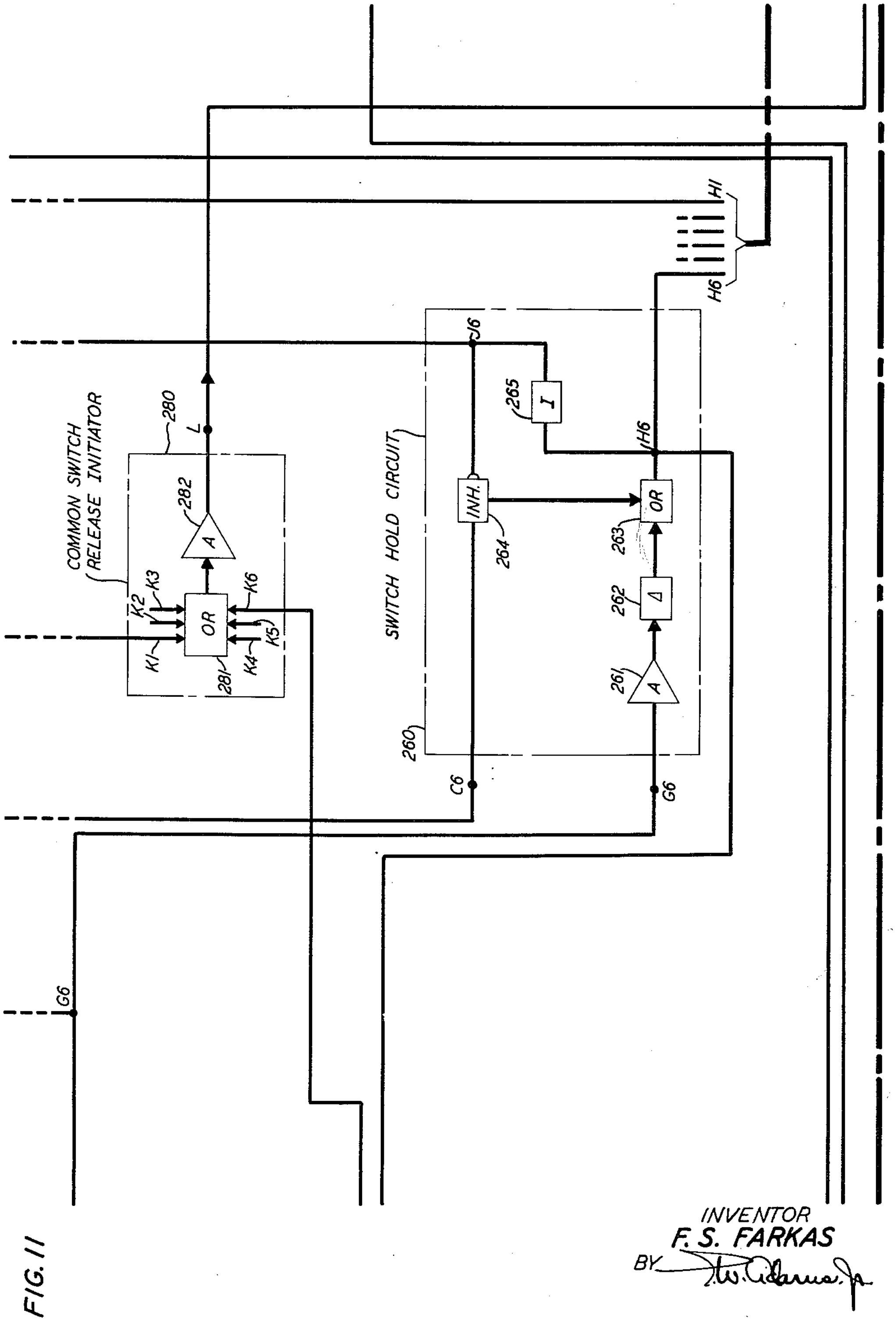
Figure 12:
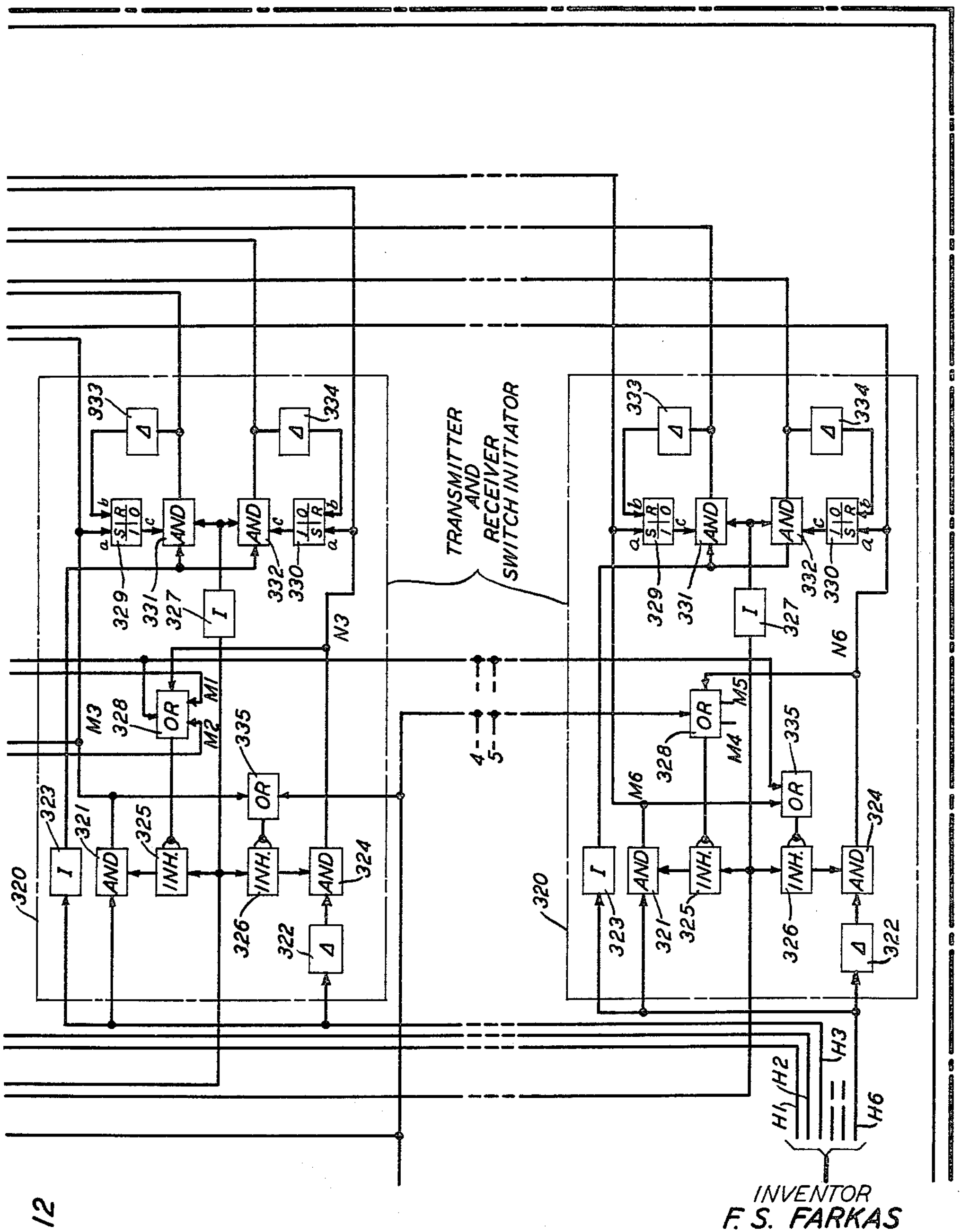
Figure 13:
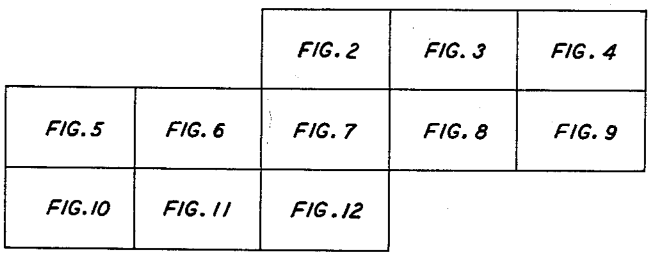
Figure 17:
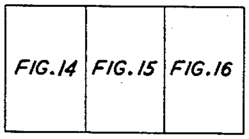

FIGS. 5 through 12, arranged according to FIG. 13, are diagrams, mostly in block form, illustrating in greater detail the equipment provided according to the invention in an auxiliary circuit;

FIG. 13 is a diagram showing the relative positions of FIGS. 2 through 12;

FIGS. 14 through 16, arranged according to FIG. 17, comprise a form of truth table showing the signals existing at particular inputs and outputs of the circuitry in the transmitter switch control of FIGS. 5, 6, 7, 10, 11 and 12 for different conditions on the transmission channels; and FIG. 17 is a diagram showing the relative positions of FIGS. 14 through 16.

Figure 1:
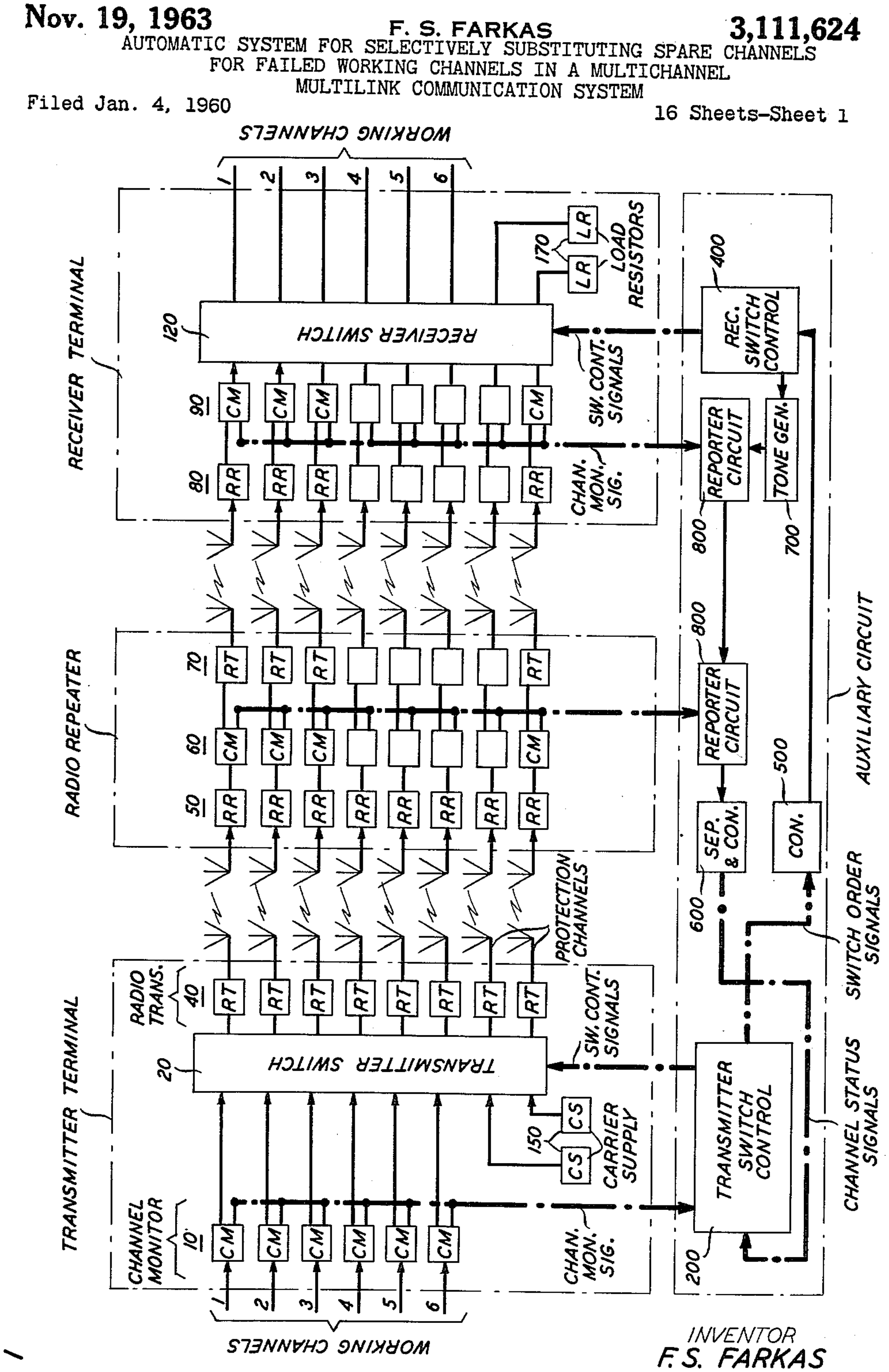
FIG. 1 is a block diagram of a flexible switching system according to the invention illustrating the circuit arrangements for a switching section including a transmitter terminal, a receiver terminal, a radio repeater and an auxiliary circuit.

FIG. 1 shows a flexible switching system according to the invention including a transmitter terminal, a receiver terminal, a radio repeater and an auxiliary circuit. The switching section shown is similar to the switching section employed in the TH radio relay system as described by Mr. McDavitt in the article referred to above. Only one radio repeater is shown for simplicity but there may be from one to six or more such repeaters depending upon the distance between the transmitter and receiver terminals.

The communication system disclosed by McDavitt includes two auxiliary channels having a narrow bandwidth and a different intermediate frequency than the working channels and protection channels. One of these auxiliary radio channels can be used to connect the elements of the auxiliary circuit of the switching section located at the transmitter terminal, the receiver terminal, and the repeater stations, or these elements can be connected by by wire lines.

The switching section disclosed includes terminal stations and repeater points; but it is understood that the present invention will operate in a switching section including repeater stations and only one terminal station or a switching section including only one terminal station. An example of a switching section of only one terminal station is that existing where a plurality of microwave channels is terminated at a receiver terminal and the signal from these channels is coupled to a plurality of baseband frequency channels at a transmitter terminal. Both the microwave channel receiver terminal and the baseband channel transmitter terminal are located at the same terminal station and are coupled not only by working channels but also by protection channels.

The signals on the working channels, of which working channel 1 is typical, enter the switching section at the transmitter terminal. Here the signal passes through the channel monitor 10 (which monitors its energy level), and the transmitter switch 20 to the radio transmitter 40. The signal entering the radio transmitter 40 is usually at the intermediate frequency of the system. This signal may then be heterodyned up to the microwave frequency and radiated from the transmitter terminal. At the repeater the radio signal is then received by the radio receiver 50 and is changed to the intermediate frequency of the system. It is then passed through channel monitor 60 to the radio transmitter 70. In radio transmitter 70, the signal is heterodyned up to the microwave frequency and is reradiated. After being radiated from the last repeater in the switching section, the signal is received by the radio receiver 80 in the receiver terminal. The signal frequency is reduced to the intermediate frequency and the signal is passed from the radio receiver 80 through a channel monitor 90 to the receiver switch 120. This signal, after passing through receiver switch 120, is distributed to points of utilization or applied to a subsequent switching section.

The reliability of the system is improved in accordance with the invention by the automatic substitution of either of two protection channels for a failed working channel in a switching section. Whether a working channel in this switching section has failed or not is determined by evaluating the energy level of the signal received at the repeaters and at the receiver terminal. The channel monitors 60 and 90 at these points, after evaluating the signal, will notify the auxiliary circuit of the condition of the working and protection channels. For the protection channel to be monitored by the channel monitors 60 and 90, a signal must be present on these channels. Therefore, when these protection channels are idle (that is, are not replacing working channels), a monitoring signal is supplied to them by the protection channel IF carrier supply 150. Also under this condition, provision is made for absorbing the energy of this monitoring signal at the receiver terminal of the switching section. Therefore, protection channel load resistors 170 are supplied to absorb the energy on the protection channels when they are not replacing a working channel.

When the auxiliary circuit receives signals from the channel monitors 60 and 90 informing it of the condition of the chnanels, the circuit will effect or not effect a switch to a protection channel as the condition of the working channel reported by the monitors may warrant. This auxiliary circuit is composed of a transmitter switch control 200, a receiver switch control 400, a converter 500, a separator and converter 600, a tone generator 700 and reporter circuits 800. Of these elements, channel monitors 60 and 90 are located at the repeater and receiver terminal stations, respectively, as are the reporter circuits associated with these monitors. The tone generator 700 is located at the receiver terminal and the converter 500 and the separator and converter 600 are located at the transmitting terminal. These elements can be coupled by either a radio channel or a wire line.

The tone generator 700 at the receiver terminal generates channel status signals which are normally transmitted through the reporter circuits 800 in tandem to the separator and converter 600 at the transmitter terminal. When a working channel or protection channel is not functioning properly, the reporter circuits 800 act in accordance with a signal from the channel monitors 60 or 90 to terminate this channel status signal at this point for any particular channel and thus notify the transmitter switch control 200 of a failure in the particular channel.

The transmitter switch control 200 also receives a channel monitor signal input from the channel monitors 10 in the transmitter terminal. This signal from channel monitor 10 gives an indication as to whether working channel signal failure is due to a fault in a previous switching section or in the instant switching section. If the fault is located within the instant switching section, a signal is sent from the transmitter switch control 200 to the transmitter switch 20 which effects a bridging switch from the failed working channel to a selected protection channel. Also, when it has been determined that the fault is within the instant switching section, the transmitter switch control 200 sends a signal, which is converted from direct current to tone form by converter 500, to the receiver switch control 400. The receiver switch control 400 acts in response to this signal to produce a signal which is supplied to the receiver switch 120 to cause a transfer from the failed working channel to the protection channel to which the connection has been made at the transmitter terminal.

For a better understanding of the operation of the switching system in accordance with applicant's invention, typical component parts as shown in operative relationship in FIGS. 2 through 12 when placed as indicated in FIG. 13 will be considered in detail.

The logic circuitry used by way of example herein is of the conventional type as described in "Pulse and Digital Circuits," by Millman and Taub, McGraw-Hill, the "Design of Switching Circuits," by Keister et al., Van Nostrand Company, Inc., and "Digital Computer Components and Circuits," by Richards, Van Nostrand. It is to be noted that in all cases herein a "1" signal is to be taken to mean some positive voltage with respect to ground and a "0" signal is to be taken to mean approximately ground potential.

CHANNEL MONITORS (FIGS. 3 AND 4)

Figure 4:
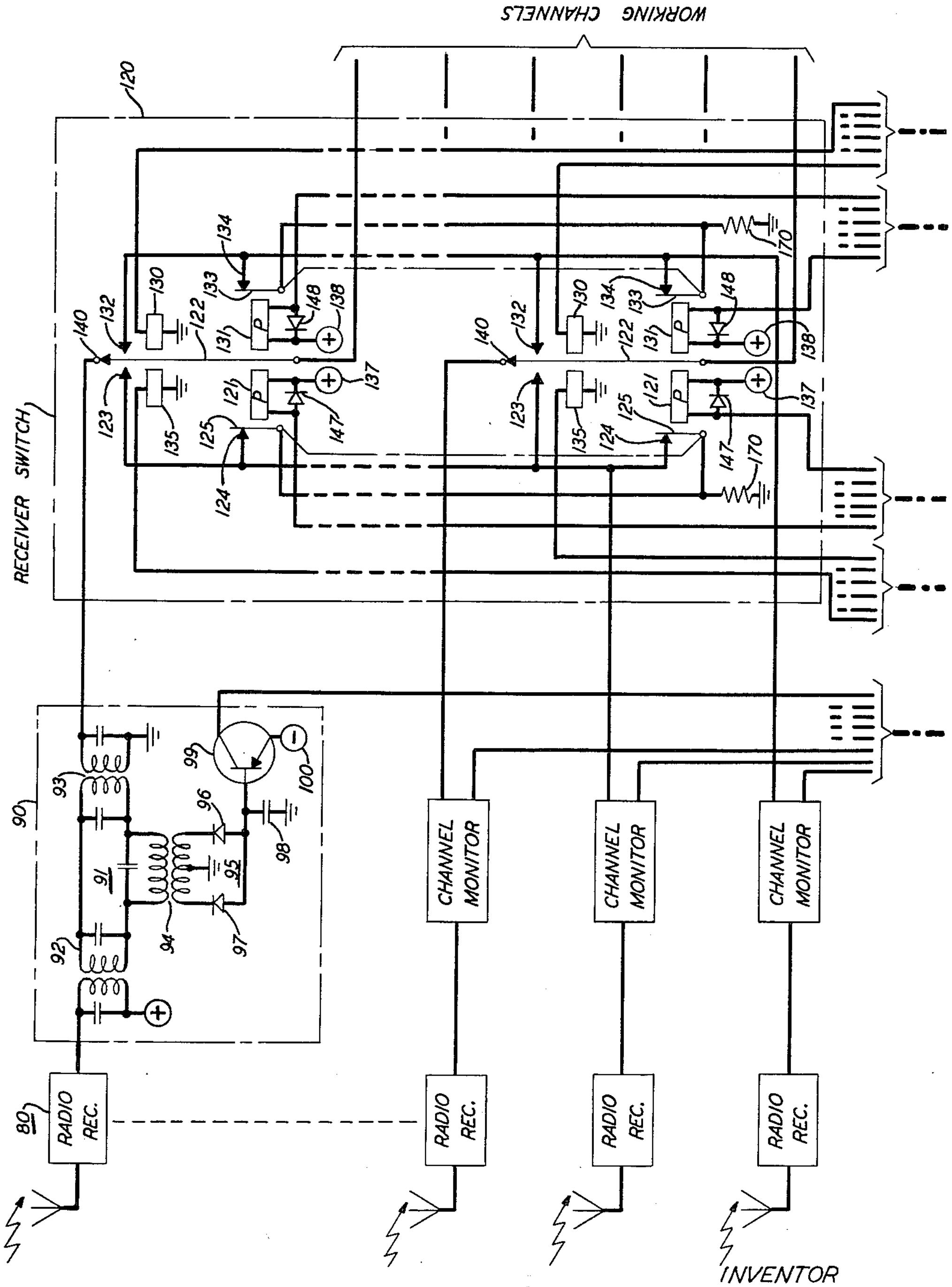
FIG. 4 is a diagram, partially in block form, illustrating in greater detail the equipment provided according to the invention at a receiver terminal.
Figure 5:
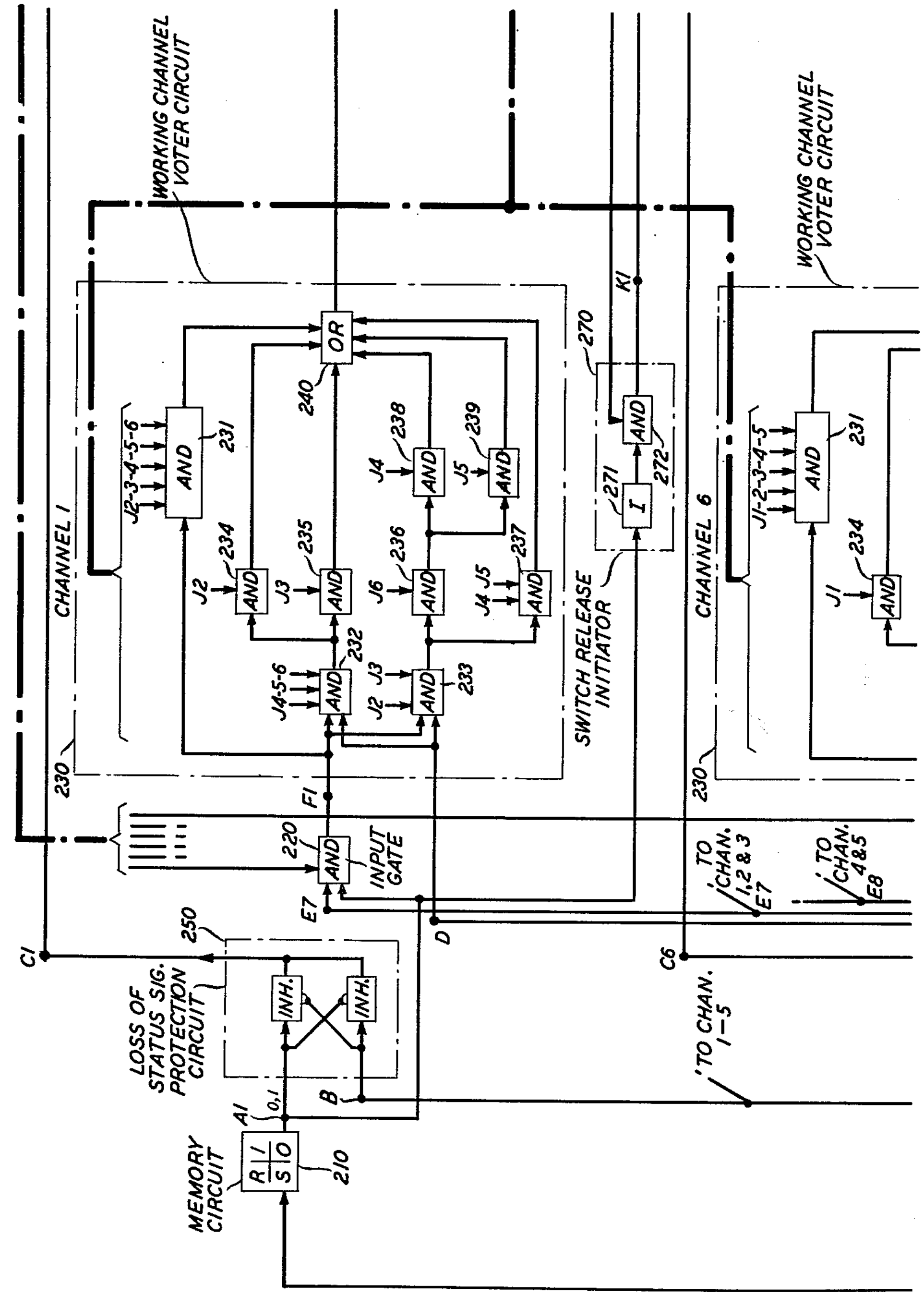
Figure 6:
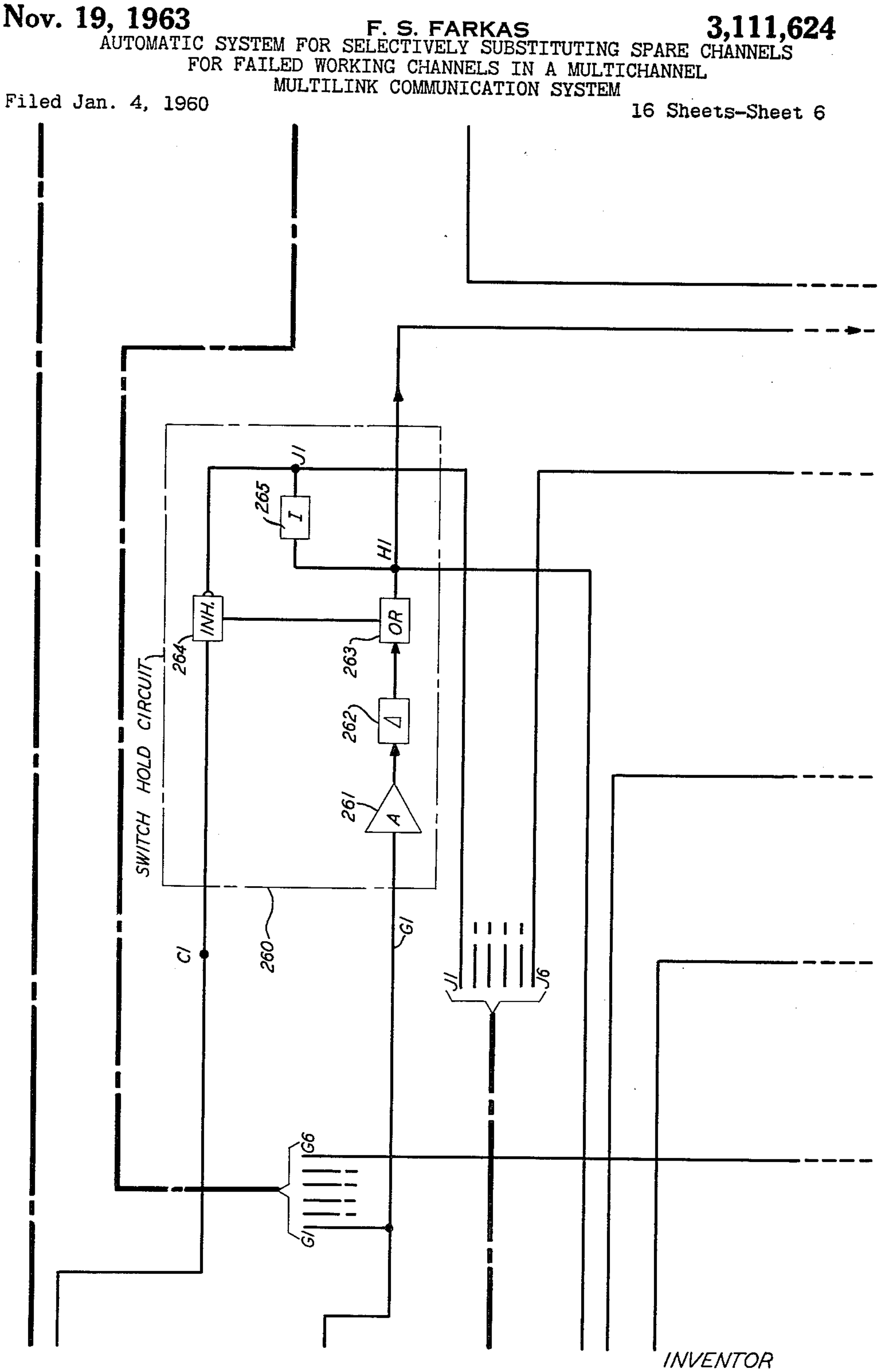

The channel monitors 60 and 90 are represented by the schematic drawing of a channel monitor 90 in FIG. 4 and produce a signal output when the condition of the working channel is satisfactory. The channel monitor 90 consists of a coupling loop 91 comprising high Q tuned circuits 92 and 93 and low Q tuned circuit 94. The tuned circuit 94 will have a negligible effect on the transmission of energy from the radio receiver 80 to the receiver switch 120 when the relative Q's of the tuned circuits are so designed. The energy in tuned circuit 94 is magnetically coupled to the circuit 95. The signal coupled into circuit 95 is rectified by diodes 96 and 97 and smoothed by capacitor 98. This signal appears as a direct-current voltage across capacitor 98 and as an input to transistor 99 between the base and emitter electrodes thereof. In the emitter circuit of transistor 99 there is a bias source 100 which serves as a reference voltage, above which the input signal must be to cause conduction through transistor 99.

Figure 9:
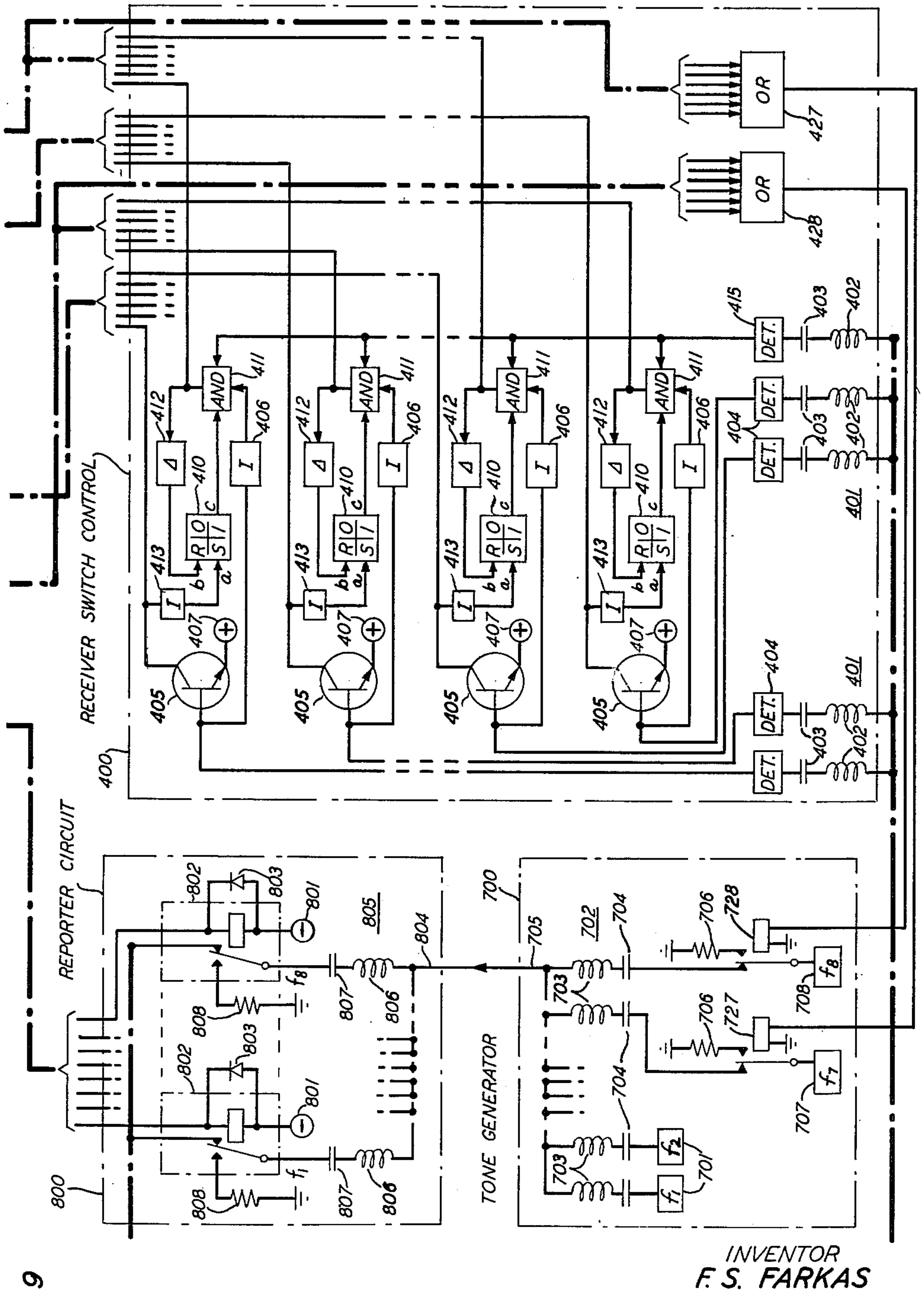

When transistor 99 conducts, there is a current flow through the emitter-collector junction thereof to the reporter circuit 800 in FIG. 9. The current flow originates with the source 801 in the reporter circuit 800 and will have a path through the winding of relay 802 associated with the particular channel that the channel monitor is monitoring. This signal flowing through the winding of relay 802 will hold the arm of this relay in the right-hand position, as shown, indicating that the channel is in proper working condition.

REPORTER CIRCUIT (FIGS. 8 AND 9)

The reporter circuit 800 consists of eight similar voltage sources 801, relays 802 and shunt diodes 803 which are associated respectively with the channel monitors of the several channels. The reporter circuit 800 has an input from each channel monitor 90 and also an input on conductor 804 of eight single-frequency tones, one for each working channel and each protection channel, from the tone generator 700. The reporter circuit 800 also consists of eight band-pass filters 805, each of which is resonant at the particular frequency associated with a particular channel. Each of the band-pass filters 805 consists of the series resonant circuit of an inductor 806 and a capacitor 807.

When a channel monitor interrupts current flow through the winding of relay 802, the reverse current caused by the collapsing magnetic field of the relay winding will flow through diode 803 instead of transistor 99 in the channel monitor 90, thereby preventing damage thereto. Also when the channel monitor interrupts the current flow through the winding of relay 802, indicating the failure of the particular channel associated with the channel monitor, the tone associated with the particular channel that has failed will be dissipated in resistor 808.

TONE GENERATOR (FIG. 9)

Two generator 700, which generates the eight tones of different frequencies that are presented to reporter circuit 800, consists of eight similar oscillators, the six oscillators 701 being respectively associated with the six working channels, and oscillators 707 and 708, respectively, being associated with protection channels 7 and 8. Each oscillator has a band-pass filter 702 connected between its output and the common conductor 705, which is connected to conductor 804 in the reporter circuit 800. Band-pass filters 702 are respectively resonant at the frequencies of the associated oscillators and prevent interferences between the oscillators. Each of the band-pass filters 702 consists of the series resonant circuit of an inductor 703 and a capacitor 704.

The tone generator 700 also includes relays 727 and 728, which are provided in accordance with the invention to provide a means for notifying the transmitter switch control 200 of the reception of and the action upon a switch release request by the receiver switch control 400. When one of the relays is activated by a signal from the receiver switch control 400, the tone associated with a particular protection channel will be removed from conductor 705 and will be dissipated by a resistor 706.

SEPARATOR AND CONVERTER (FIG. 8)

The eight tones of channels 1 through 6 and protection channels 7 and 8, which are of different frequencies, will all be passed by reporters 800 and will be present at separator and converter 600 when the working channels and protection channels are in working order. The separator and converter 600 consists of eight band-pass filters 601, each of which is resonant at the frequency of a different one of the eight tones, so that the tones can be separated to represent their particular working or protection channel. Each of these band-pass filters consists of a series resonant circuit comprising an inductor 602 and a capacitor 603 which is resonant at the frequency of one of the tones. After the tone passes through the series resonant circuit it enters detector 604 where it is changed into a direct-current signal. There will be eight direct-current signals leaving the separator and converter 600 and entering the transmitter switch control 200, which is represented by the circuits of FIGS. 5, 6, 7, 10, 11 and 12.

TRANSMITTER SWITCH CONTROL (FIGS. 5, 6, 7, 10, 11 AND 12)

The direct-current signals from converter 600 are impressed upon memory circuits in the transmitter switch control 200 and serve to inform this switch control 200 of the condition of the working and protection channels. The transmitter switch control 200, therefore, includes a memory circuit 210 (FIGS. 5 and 10) for each of the working and protection channels. The memory circuits can be flip-flop circuits or any similar circuits that will perform the function of retaining the information contained in a first signal until another signal is received containing new information. In the analysis of the transmitter switch control 200, signals that will be present to indicate certain conditions of the channels will be used to aid in the understanding of the representative embodiment disclosed herein.

Figure 7:
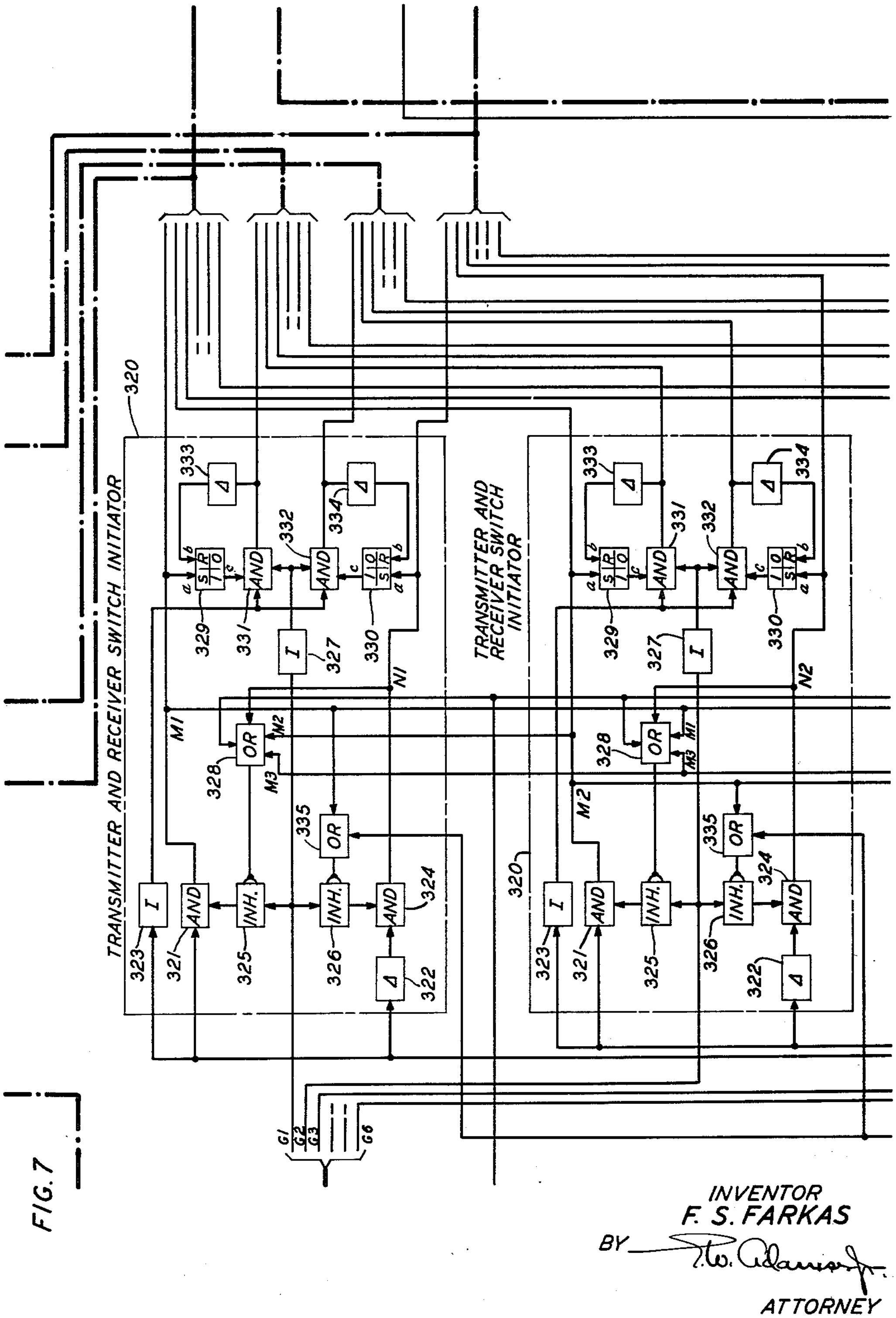

The complete circuitry in the transmitter switch control 200 is shown for only two of the working channels. However, it is understood that working channels 2 through 5 will have identical circuitry. The circuitry in the transmitter switch control 200 for a working channel is represented by blocks in the drawing and consists of memory circuit 210, input gate 220, working channel voter circuit 230, loss of status signal protection circuit 250, switch release initiator 270 (all in FIGS. 5 and 10), switch hold circuit 260 (FIGS. 6 and 11) and transmitter and receiver switch initiator 320 (FIGS. 7 and 12). A circuit common to all working channels is the common switch release initiator 280 (FIG. 11).

Figure 10:
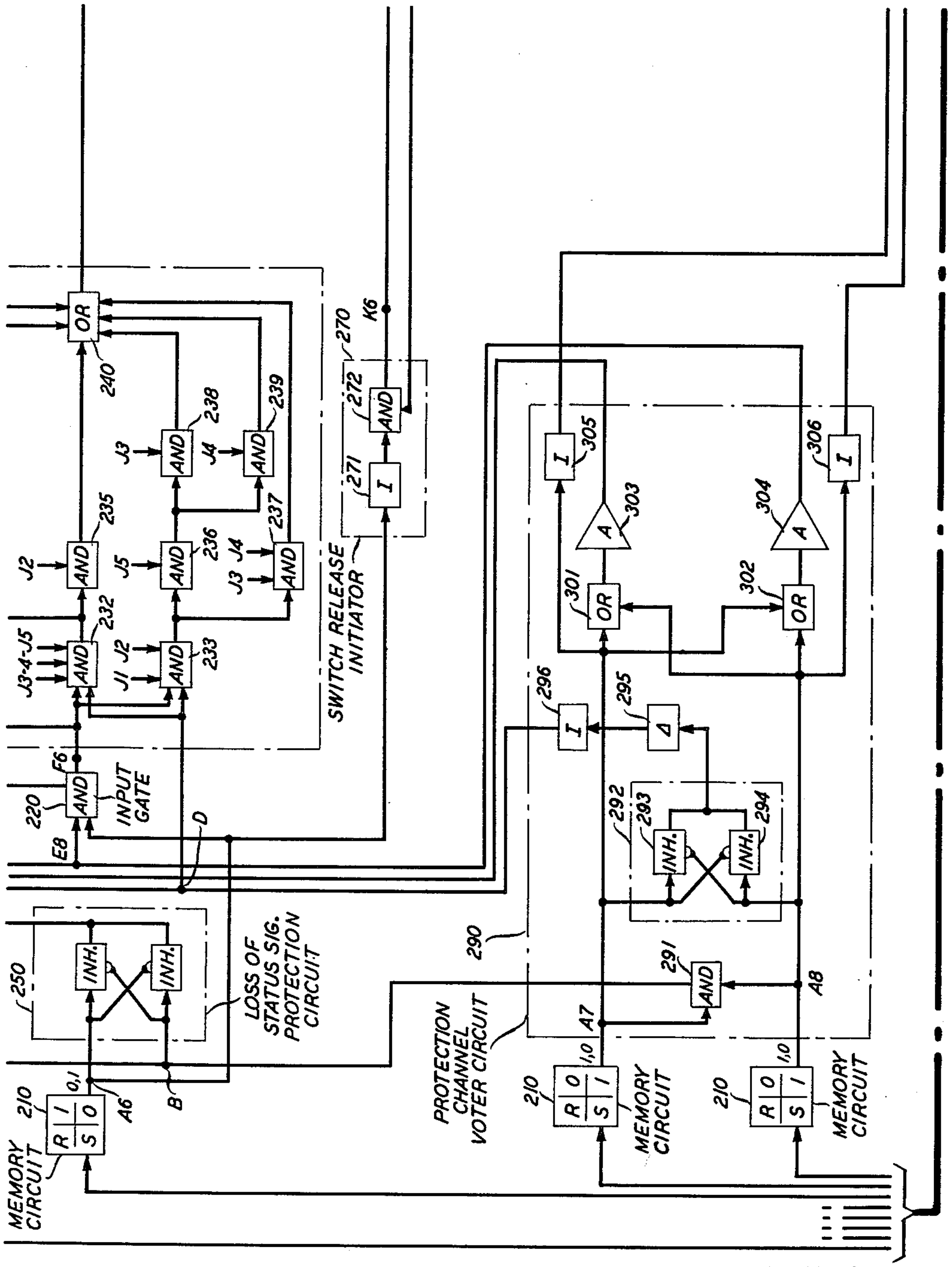

The transmitter switch control 200 further comprises circuitry for the protection channels as represented by blocks in FIG. 10 comprising individual memory circuits 210 and a common protection channel voter circuit 290.

The transmitter switch control 200 will have present eight direct-current signals from the converter 600 when all working channels and protection channels are in working order. Memory circuit 210 of each channel will have an input of one of these direct-current signals and will have an appropriate output signal.

Each memory circuit 210 of protection channels 7 and 8, respectively, will have a "1" signal output when the protection channels are in working order. This output of each memory circuit 210 in the protection channels appears at points A7 and A8, respectively. The signal appearing at points A7 and A8 will appear as input signals to protection channel voter circuit 290.

The input signals to the protection channel voter circuit 290 will be applied to the two input terminals of AND-NOT gate 292. AND-NOT gate 292 comprises inhibitors 293 and 294 interconnected to form said gate. The output of gate 292 is applied to delay circuit 295 and thereafter to inverter 296, which will invert this signal so that its output will be the inverse of the output from gate 292.

The input signal to the voter circuit 290 appearing at point A7 will also be applied to OR gates 301 and 302 and inverter 305. The output of OR gate 301 will be amplified by amplifier 303 and will thereafter appear at point E7 and at the input to the input gates 220 of working channels 1, 2 and 3. The input to inverter 305 will be inverted and thereafter applied as an input signal to each of the transmitter and receiver switch initiators 320 of working channels 1 through 6, respectively. This input will preclude the substitution of protection channel 7 when it fails for any of the working channels.

The input signal to the voter circuit 290 appearing at point A8 will also be applied as an input to OR gates 301 and 302 and inverter 306. The output of OR gate 302 will be amplified by amplifier 304 and will thereafter appear at point E8 and at the input to the input gates 220 of working channels 4, 5 and 6, respectively. The input to inverter 306, after inversion thereby, will be applied to each switch initiator 320 of working channels 1 through 6, respectively, to preclude the substitution of protection channel 8 upon its failure.

A "1" signal will appear at the output of the associated memory circuit 210 of the protection channels when the protection channels are in working order. This output of each memory circuit 210 in the protection channels appears respectively at points A7 and A8.

The output of the memory circuit 210 in the working channel circuitry which appears at points A1 through A6 will be a "0" when the working channels are in good condition. This output will appear as inputs to the input gate 220 and the switch release initiator 270. The input gate 220, which is a three-input AND gate, also has an input from the protection channel voter circuit 290. The third input to gate 220 comes from channel monitor 10 in the transmitter terminal of FIG. 2. A "1" signal will appear at this input from the channel monitor in each working channel as long as the working channel in the preceding switching section is functioning properly. If a particular working channel in the preceding switching section is not functioning properly, a "0" signal will appear at this input to gate 220 and will prevent the transmitter switch control 200 from acting upon a switch request in the instant switching section for that working channel. Input gate 220 determines whether a failure is in a preceding switching section, whether the protection channels are functioning properly, and whether its associated working channel is requesting a switch. On the basis of its input signals it will or will not produce an input to working channel voter circuit 230 to effect a switch.

The output of gate 220 appears as an input to the working channel voter circuit 230. The working channel voter circuit 230 also receives an input from the protection channel voter circuit 290. There is a third input to the working channel voter circuit 230 which is in the form of a lockout signal appearing in a feedback loop coming from the switch hold circuit 260. The working channel voter circuit 230 determines whether a one-for-six protection system is available and is to be used or whether a two-for-six protection system is available and is to be used.

The output of the working channel voter circuit 230 appears as an input to the switch hold circuit 260. There is also an input to the switch hold circuit 260 from the loss of status signal protection circuit 250, which, in turn, has inputs from memory circuit 210 and protection channel voter circuit 290. The loss of status signal protection circuit 250 is an AND-NOT gate in which, if both inputs are a "1" there will be a "0" output; if both inputs are a "0" there will also be a "0" output, but if the inputs are different there will be a "1" output.

The switch hold circuit 260 outputs appear as inputs to the switch release initiator 270 and the transmitter and receiver switch initiator 320 and as lockout signal inputs to working channel voter circuit 230.

The switch hold circuit 260 provides an output signal that precludes the release of a transmitter bridging switch until a switch release request is verified by the receiver switch control 400. If a switch has been made and there is a subsequent loss of tone on the protection channels, there will be an input to the switch hold circuit 260 from the loss of status signal protection circuit 250 that will produce an output from the switch hold circuit 260 to hold the switch.

It is generally desirable to assign to the two protection channels frequencies which are at the extremes of the frequency spectrum being utilized by the radio relay system. This is true because when a channel failure is due to fading, the fade usually occurs only at a particular frequency or in a small range of frequencies and not over the entire spectrum that is being utilized. Therefore, the possibility of both protection channels failing at the same time, due to fading, is very remote.

There are different ways of assigning working channels to a particular protection channel. By way of illustration, the protection channels herein have been assigned so that protection channel 7 will serve working channels 1 through 3 before it will serve working channels 4 through 6 and protection channel 8 will serve working channels 4 through 6 in preference to working channels 1 through 3. The circuit which provides this preference of one working channel over another or a group of working channels over another is the transmitter and receiver switch initiator 320.

Switch initiator 320 has inputs from the working channel voter circuit 230 and switch hold circuit 260 of each respective channel. Switch initiator 320 has output signals for application to the transmitter switch of FIG. 2 which will cause a switch to be made or released in accordance with the signal inputs to switch initiator 320. Switch initiator 320 also has outputs which appear as inputs to receiver switch control 400 after being converted from a direct-current signal to a tone by converter 500.

The transmitter and receiver switch initiators 320 are shown for working channels 1, 2, 3 and 6. The switch initiators for working channels 2 and 3 are included to show the interconnection between working channels 1, 2 and 3 when these working channels are assigned to protection channel 7 in preference to protection channel 8.

The components of switch initiator 320 that provide this assignment of a group of working channels to one protection channel in preference to another protection channel will be better understood when considered with the detailed description of the operation of the transmitter switch 200, infra. The circuit components for releasing a transmitter switch will also be described herein with the detailed description of the transmitter switch 200.

CONVERTER (FIG. 8)

Figure 8:
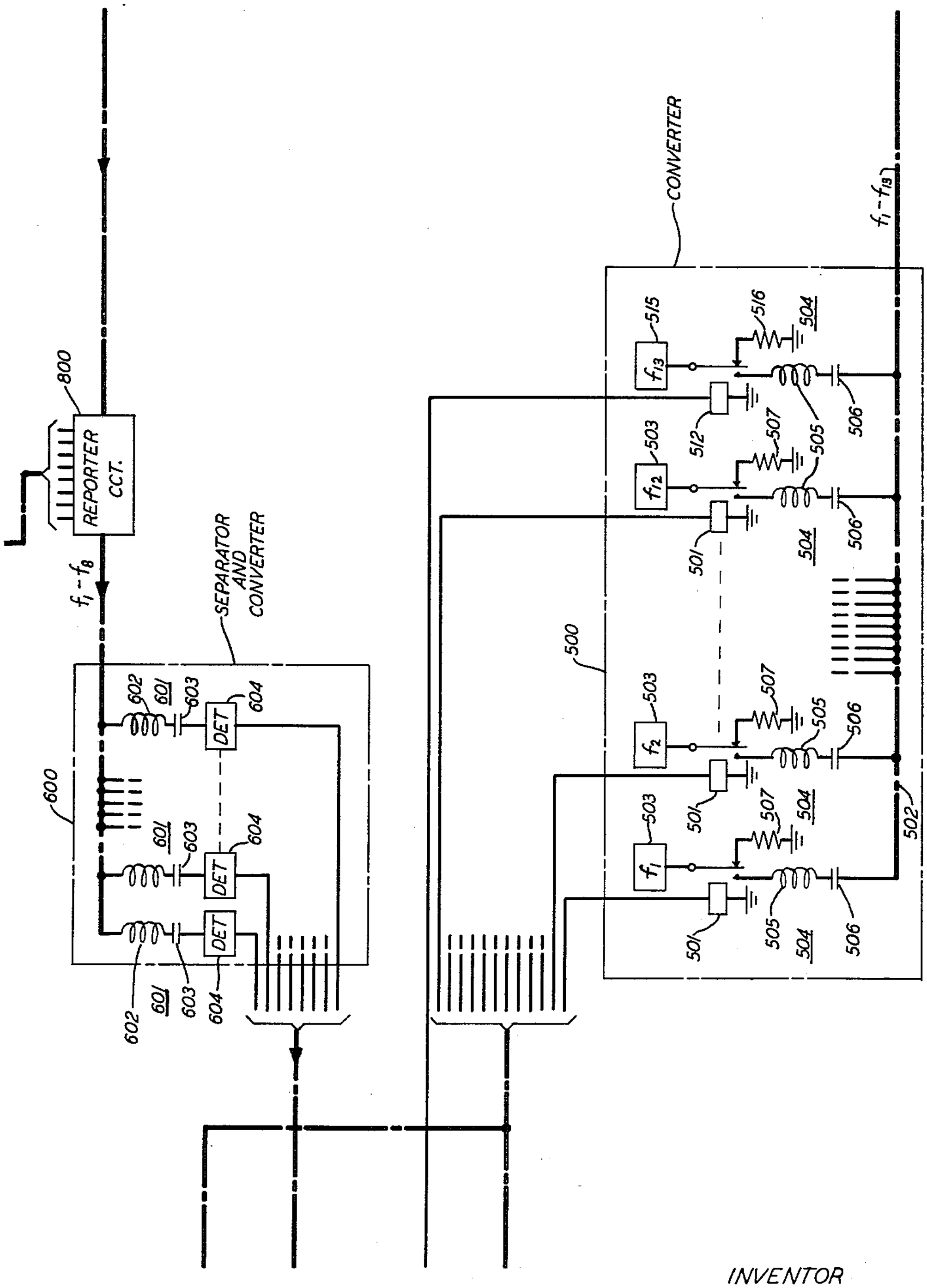

The various control signals produced by the initiators 320 and destined for the receiver switch control 400 are conveniently transmitted to the receiver terminal as tone signals in the same manner as the tones are transmitted from the reporter circuits 800 to the transmitter terminal. Conversion of the direct-current signals to tone form is accomplished by converter 500 (FIG. 8).

The inputs from the transmitter and receiver switch initiator 320 in the transmitter switch control 200 are in the form of direct-current signals and operate the corresponding ones of relays 501, thereby placing a tone of assigned frequency upon conductor 502 for transmission to the receiver switch control 400. By way of example, after working channel 1 has requested a switch and has been assigned to protection channel 7, a direct-current signal will activate the relay 501 that is associated with working channel 1 and protection channel 7. This will place the tone having the frequency associated with this particular working channel and protection channel on conductor 502 for transmission to the receiver switch control 400 where it will effect a switch.

The tones respectively associated with the several combinations of working and protection channels are generated by oscillators 503. Interaction between oscillators connected simultaneously to conductor 502 are prevented by the band-pass filters 504. Each of the band-pass filters 504 comprises a series resonant circuit of an inductor 505 and a capacitor 506. Resistors 507 serve as loads for those ones of oscillators 503 which are not connected to conductor 502 at any particular time.

The single input to converter 500 from the common switch release initiator 280 in the transmitter switch control 200 is applied to relay 512. The energization of relay 512 is an indication that a switch release is being placed on conductor 502 to be transmitted to the receiver switch control 400 where it will effect a switch release. When a switch release is not being requested, the tone from oscillator 515 will be dissipated in resistor 516.

RECEIVER SWITCH CONTROL (FIG. 9)

The tones from the converter 500 are received by the receiver switch control 400 (FIG. 9) and appear therein as inputs to the band-pass filters 401. Each of the band-pass filters 401 consists of an inductor 402 and a capacitor 403 in series forming a series resonant circuit which is resonant at the frequency of a particular one, When a tone associated with a particular protection channel and working channel is passed by the corresponding series resonant circuit 401, it is changed to a direct-current signal by a detector 404 associated with that circuit 401. The output of each detector 404 appears as an input to an inverter 406 and also as an input to a transistor 405 which acts as an ON-OFF gate circuit, these elements being provided for each of the detector outputs. Each of transistors 405 has a bias source 407 in its emitter circuit which the signal input to the base electrode must exceed before the emitter-collector current can flow. When this emitter-collector current flows through transistor 405, the output of transistor 405 will be a "0" which will be applied to inerter 413 and also as an input to receiver switch 120. The source of emitter-collector currents for those transistors is found in the receiver switch unit 120 and comprises either a battery 137 associated with relay 121 and protection channel 7 or a battery 138 associated with relay 131 and protection channel 8. The transistors 405 are protected from the induction of their associated relays by diodes 147 connected across relay 121 associated with protection channel 7 and by diode 148 connected across relay 131 associated with protection channel 8.

In a typical channel of the receiver switch control the "0" signal input to inverter 413 will be changed to a "1" signal and applied as an input to memory device 410. This "1" signal input will set this device so that there will be a "1" signal on terminal *c* until a reset signal of a "1" appears on its *b* input terminal. Therefore, when a switch request is made, the same signal that effects a switch in the receiver switch 120 will prepare the circuitry associated with this particular switch for any subsequent switch release request by placing a "1" signal on memory device 410 so that there will be a "1" signal on an imput terminal of associated AND gate 411.

The switch release circuitry of the receiver switch control 400 consists of an inverter 406, a memory device 410, an AND gate 411, a delay circuit 412 and an inverter 413 for each tone input channel and a detector 415 common to all of these channels. Detector 415 will have a direct-current output of a "1" signal when a switch release request is received from the transmitter switch control 200. This direct-current signal will be applied to the AND gate 411 in each of the circuits. Since there is normally a "0" signal on the input of the associated inverter 406, the output of this inverter will be a "1" and will appear at the other input to the corresponding AND gate 411. However, the only AND gate 411 that will have a "1" signal output to effect a switch release will be the one that is associated with the working channel that has been previously switched to a particular protection channel. Only in this tone channel circuit will a "1" signal, at the time of switching, have operated to set the memory device 410 so that there is a "1" signal input to make AND gate 411 ready for operation.

The OR gates 427 and 428 in the receiver switch control 400 are connected to the output of the switch release circuit and will have an input signal whenever there is a switch release request received and acted upon by receiver switch control 400. OR gate 427 will have an input whenever a working channel that has been switched to protection channel 7 is to be released and OR gate 428 will have an input whenever a working channel that has been switched to protection channel 8 is to be released. The output of OR gate 427 is conductively coupled to tone generator 700 wherein it will cause the removal of the tone assoicated with protection channel 7 so that the transmitter switch control 200 will be informed of the reception of the switch release request and can thereafter release the transmitter switch. The output of OR gate 428 acts similarly upon the tone associated with protection channel 8 to effect a release of the transmitter switch that is bridging a working channel to protection channel 8.

The absence of the tones associated with the protection channels will be of short duration because the output of the AND gate 411, which causes this absence, is of short duration. The output of each AND gate 411 is coupled through the corresponding delay circuit 412 to the *b* input terminal of the associated memory device 410. The "1" signal now appearing on the *b* input will reset memory device 410 so that it will have a "0" signal output causing the output of AND gate 411 to become a "0."

RECEIVER SWITCH (FIG. 4)

A typical transfer switch in accordance with the invention might be composed of solid state diode switches, mercury switches, or some similar fast response switch. By way of example, however, and for ease of illustration a mechanical relay switch is shown in FIG. 4.

The illustrative receiver switch 120 (FIG. 4) acts upon the information it receives from the receiver switch control 400 either to make a transfer or to release a transfer previously made.

A switch request received for working channel 1 and protection channel 7, for example, will energize a polarized relay 121 so that arm 122 will break with contact 140 and make with contact 123 in working channel 1. The energization of this relay 121 will place the output of protection channel 7 on working channel 1 for transmission to subsequent switching sections or to utilization points.

Before the action of relay 121, the output of protection channel 7 will be coupled to load resistor 170 through arm 125 and contact 124 of relay 121. The energization of relay 121 will break the contact between arm 125 and contact 124. All of the arms 125 on the left side of receiver switch 120 related to protection channel 7 are mechanically coupled so that when polarized relay 121 in any one of the working channels is energized, the path to load resistor 170 for protection channel 7 will be opened.

Once the polarized relay 121 has been energized to make a transfer to protection channel 7, the switch will be held by the action of the residual magnetism of relay 121 until a relay 130 is energized to overcome this residual magnetism and release the switch. Relay 130 is connected in the output circuit of the switch release circuitry for protection channel 7 and a particular working channel in the receiver switch control 400. If working channel 1 has been transferred to protection channel 7, for example, AND gate 411 in receiver switch control 400 associated with this working channel and protection channel will have a signal output to energize relay 130 in receiver switch 120. This signal from AND gate 411 appears at relay 130 only long enough to activate this relay 130 to return arm 122 to its normal position.

The reluctance of the flux path of polarized relay 121 will be increased sufficiently by the movement of arm 122 from this path so that arm 125 will return to its normal position.

When a working channel is assigned to protection channel 8 by transmitter switch control 200, polarized relay 131 will be energized to effect a transfer switch from this working channel to protection channel 8 by causing arm 122 to make contact with contact 132. The energization of polarized relay 131 will also cause arm 133 to move away from contact 134, thereby disconnecting the output of protection channel 8 from its carrier load resistor 170. The release of this transfer switch will be effected in the same manner as the release of the transfer switch in protection channel 7 when relay 135 is energized.

TRANSMITTER SWITCH (FIG. 2)

A typical bridging switch in accordance with the invention might also be composed of fast-response electronic switches similar to the receiver switch. However, by way of example, the transmitter switch 20 (FIG. 2) is illustrated as composed of a mechanical relay switch.

A switch request signal indicating that a bridging switch is to be made from a working channel to a protection channel is sent from the transmitter switch control 200 to the transmitter switch 20. For example, if transmitter switch control 200 sends a signal from its transmitter and receiver switch initiator 320 requesting a bridging switch to protection channel 7 by working channel 1, polarized relay 21 in working channel 1 will be energized. Relay 21 will now cause arm 22 to make contact with contact 23, thereby bridging working channel 1 to protection channel 7. At the same time arm 25 of relay 21 will break contact with contact 24, thereby removing the carrier supply signal from protection channel 7. It is noted that arm 25 is mechanically coupled to arm 26 so that when arm 25 moves to the right breaking contact with contact 24, arm 26 moves to the right and makes contact with contact 27, thereby connecting the carrier supply source 150 for protection channel 7 to resistor 29 which will dissipate this signal.

A similar action takes place when protection channel 8 is assigned to a working channel. Polarized relay 31 makes the bridging switch between the working channel and protection channel 8 by making contact between arm 22 and contact 32 of the particular working channel. The energization of relay 31 also causes the removal of the carrier signal of source 150 from protection channel 8 by breaking contact between arm 33 and contact 34. With arm 33 and arm 35 mechanically coupled, the breaking of contact between arm 33 and contact 34 will cause the making of contact between arm 35 and contact 36, thereby placing the carrier signal of protection channel 8 across resistor 37.

To release a bridging switch once it has been made, a signal must be received by the transmitter switch 20 from the transmitter switch control 200. The residual magnetism of polarized relay 21 of protection channel 7 and polarized relay 31 of protection channel 8 will hold the switch that has been made until relay 30 of protection channel 7 or relay 38 of protection channel 8 is energized long enough to release this switch.

There are a number of operating conditions in the switching system that the transmitter switch control 200 must recognize and thereupon furnish appropriate signals to the transmitter switch 20 and receiver switch control 400. To better understand the operation in accordance with this invention of the transmitter switch control 200, the table of FIGS. 14 through 16 (relatively positioned as in FIG. 17) may be used in conjunction with the following description of the operation of this switch control.

This table contains a number of cases that set forth the operation of the transmitter switch control for a number of representative operating conditions of the swiching system. The following is a description of the action of the transmitter switch control, therein illustrating a number of the features of the invention.

*Case 1*

The first case to be considered will be that occurring where all of the working channels and protection channels are in working order and there is no malfunction present in either the radio relay system or the auxiliary circuit associated therewith. The inputs to memory circuit 210 of the working channels and the protection channels indicate that all channels are operating properly. The output of the memory circuit 210 appearing at points A1 through A6 in the working channel circuits is a "0" signal, this being the assigned normal condition. This "0" signal will appear as inputs to input gate 220, protection circuit 250, and switch release initiator 270.

The outputs of the memory circuit 210 appearing at points A7 and A8 in the protection channel circuits will be a "1" signal for normal operation. This "1" signal will appear as inputs to the AND gate 291 in the protection channel voter circuit 290. When both inputs to the AND gate 291 are "1's" there will be an output of a "1" signal which appears at point B and as the input to each protection circuit 250 in the working channels 1 through 6.

With a "0" at each points A1 through A6 and a "1" at point B, the protection circuits 250 of each working channel 1 through 6, respectively, will have a "1" output which appears at points C1 through C6 respectively, and as an input to the switch hold circuit 260 of each working channel.

The outputs of memory circuit 210 in the protection channels 7 and 8 also appear as the inputs to AND-NOT gate 292. When the inputs to AND-NOT gate 292 are both a "1" there will be a "0" output signal from this gate. The output of gate 292 appears as the input to delay circuit 295 which, after a predetermined time of delay, will allow this signal to appear at inverter 296. When the input to inverter 296 is a "0," as herein assumed, the output will be a "1." This output appears at point D and as an input to each working channel voter circuit 230 of the working channels 1 through 6.

The outputs of memory circuit 210 in protection channels 7 and 8 also appear as inputs to OR gates 301 and 302 and inverters 305 and 306. When there is a "1"

appearing on any one of the inputs of the OR gate 301, it will have a "1" output. This output of OR gate 301 will be amplified by amplifier 303 and will appear at point E7 and as an input to input gate 220 in working channels 1, 2 and 3. Similarly, when OR gate 302 has a "1" appearing at any one of its inputs, it will have a "1" output which will be amplified by amplifier 304 and will appear at point E8 and as an input to input gate 220 in working channels 4, 5 and 6.

Figure 2:
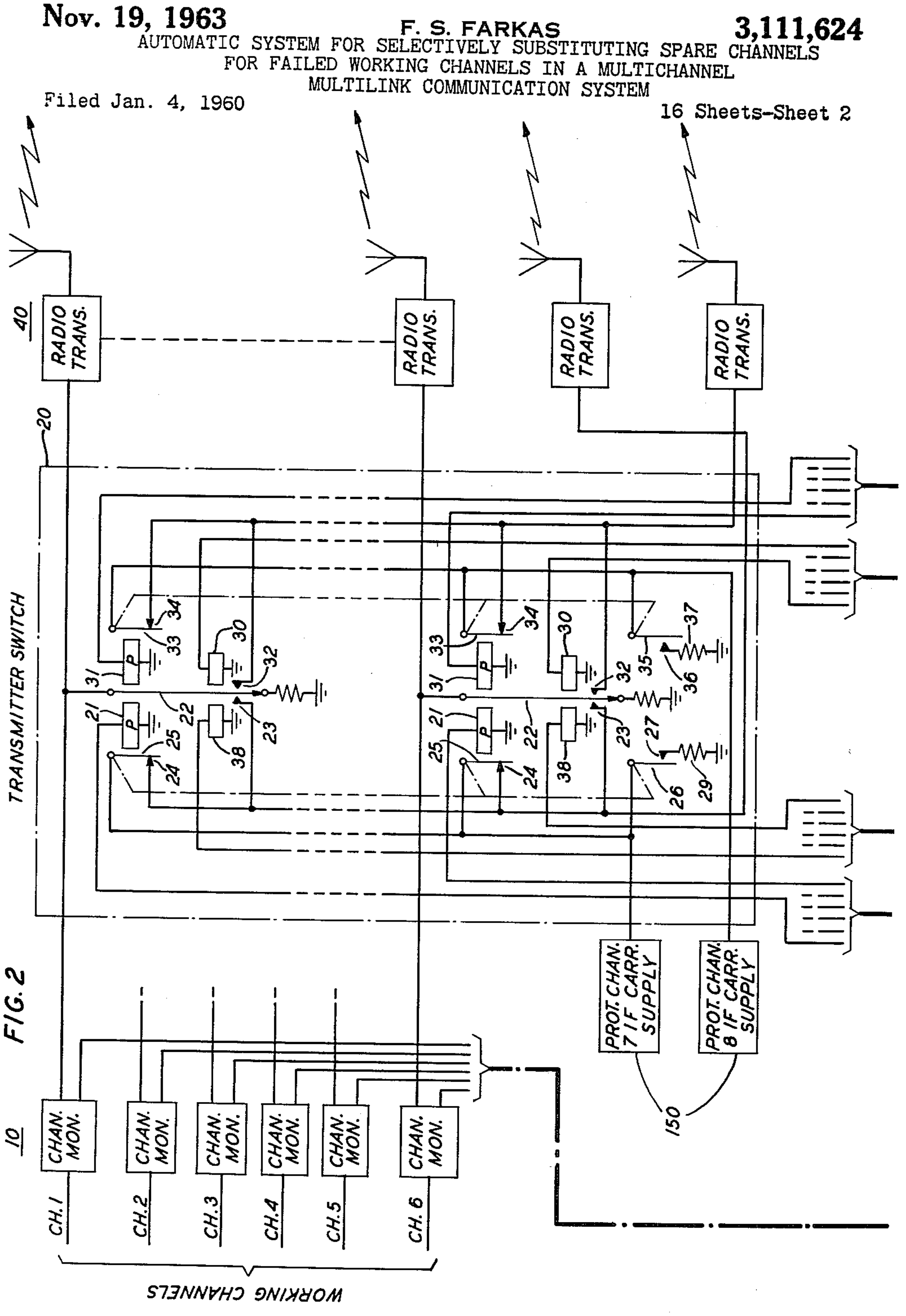
FIG. 2 is a diagram, partially in block form, illustrating in greater detail the equipment provided according to the invention at a transmitter terminal.
Figure 3:
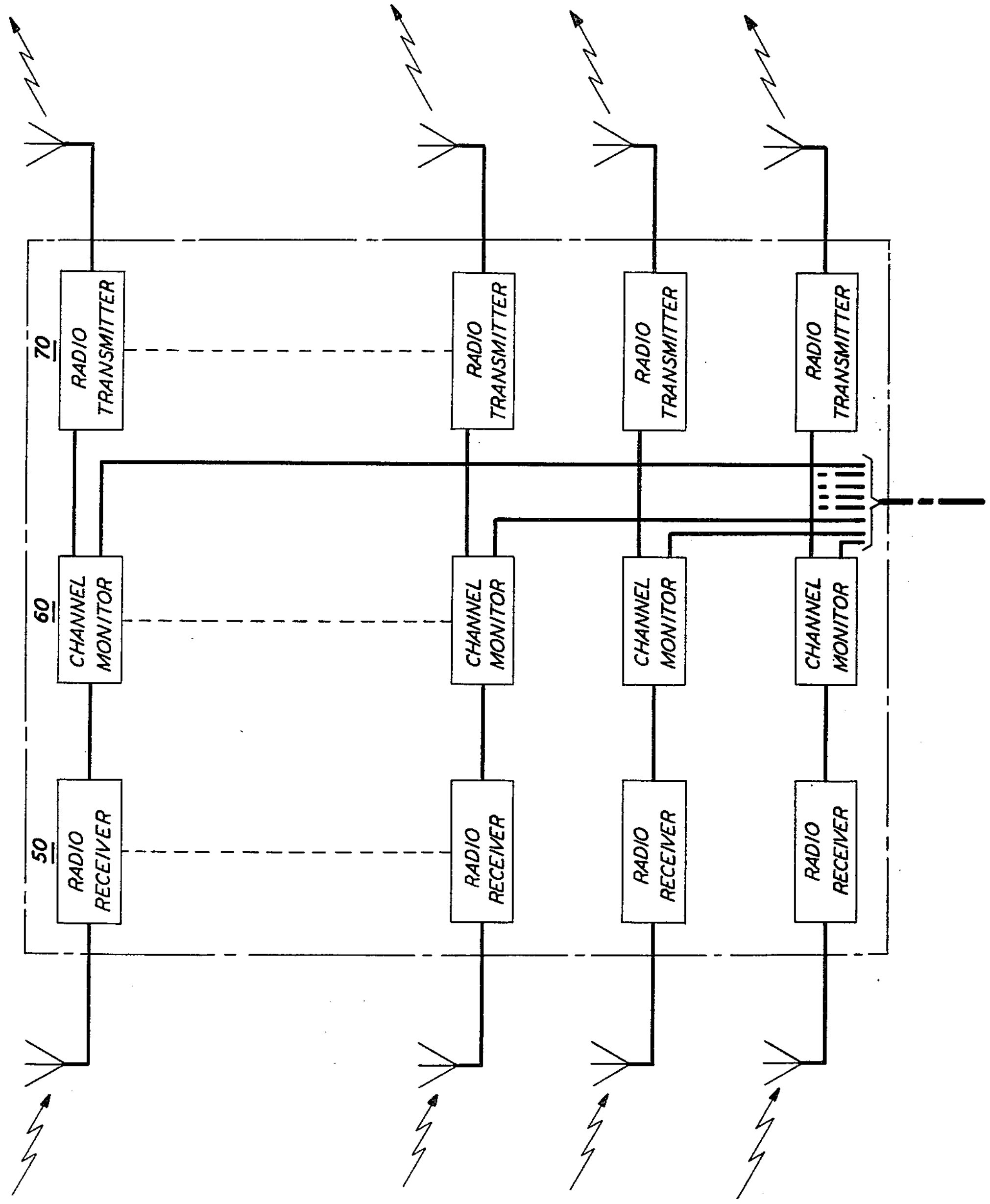
FIG. 3 is a block diagram of the radio repeater of FIG. 1.

Each input gate 220 of working channels 1 through 6 has a third input which comes from the channel monitor 10 in FIG. 2. When the inputs to input gate 220 are a "1" signal from the protection channel voter circuit 290, a "1" signal from channel monitor 10 and a '0" from memory circuit 210, as herein assumed, it will be a "0" output. This output will appear at points F1–F6 of working channels 1 through 6, respectively, and as an input to each working channel voter circuit 230.

It shall be assumed in all cases herein considered that the input to the transmitter switch control 200 from the channel monitor 10 at the transmitted terminal will indicate that the preceding switching section is functioning properly; and any trouble that may develop will be assumed to be in the instant switching section. However, if there is a faulty working channel in the preceding switching section, the output of the associated channel monitor for that channel will have an output to so indicate. For example, if working channel 1 has failed in the preceding switching section, channel monitor 10 of working channel 1 will have a "0" signal output appearing as an input to input gate 220 in the transmitter switch control 200. This "0" signal input on the input gate 220 will prevent this gate 220 from passing a signal to effect the substitution of a protection channel for working channel 1 in the instant switching section.

The proper functioning of the preceding switching section and of the channel monitors 10 at the transmitter station will provide a "1" signal input to input gate 220 at all times as herein assumed.

If a one-for-six protection system is to be used, the signal from input gate 220 will take the path through AND gate 231. However, when both protection channels are in working order and a two-for-six protection system is to be used, the signal will have alternate paths. The portion of the working channel voter circuit 230, which furnishes the two-for-six protection system, comprises AND gates 232, 233, 234, 235, 236, 237, 238 and 239. When either system is available, a signal input to OR gate 240 will produce an output that will appear at point G1 and as an input to switch hold circuit 260. The working channel voter circuit 230 of working channels 1 through 6 will have an output that will appear at points G1 through G6, respectively. When all working channels and protection channels are functioning properly a "0" will appear at points G1 through G6 and as an input to switch hold circuit 260 in each working channel circuit.

Switch hold circuit 260 holds a switch once it is made until a signal is received from the receiver switch control 400 indicating that the switch release signal from the transmitter switch control has been received and acted upon. The input to switch hold circuit 260 from the working channel voter circuit 230 is amplified by amplifier 261 and then fed into a delay circuit 262. After the delay circuit 262 delays this signal for a proper interval, it will appear as an input to OR gate 263. The other input to switch hold circuit 260 from protection circuit 250 is applied directly to inhibitor 264. This signal will not flow through inhibitor 264 because there will be an inhibit signal thereon for the conditions assumed. The reason for this inhibit signal is that before any signal arrives at OR gate 263 there will be a "0" signal appearing at its output at point H. The output of OR gate 263 appears as an input to inverter 265. When the input to inverter 265 is a "0," the output is a "1" which appears at point J and on the inhibit terminal of inhibitor 264, thereby inhibiting any signal from flowing therethrough.

The output of OR gate 263 appears as an input to switch release initiator 270. The switch release initiator 270 also has an input from the memory circuit 210. The input to switch release initiator 270 appearing at inverter 271 from the memory circuit 210 will be a "0" for the conditions herein assumed. When this input to inverter 271 is a "0" its output will be a "1" which appears as one of the inputs to AND gate 272. The other input to AND gate 272, which is the output of OR gate 263 of switch hold circuit 260, will be a "0" signal when no switch request is being received. In the case herein assumed with the "0" on one input of this AND gate 272, the output will be a "0". This output will appear at point K and as an input to the common switch release initiator 280.

The switch hold circuit of all of the other working channels will have similar signals appearing at the output of its OR gates and inverters, therefore, a "0" signal will appear at points H1 through H6 and a "1" signal will appear at points J1 through J6.

Also the output of each switch release initiator of each working channel will have a "0" signal output appearing at points K1 through K6.

Switch release initiator 280 is common to working channels 1 through 6, so that a single transmission line can carry the switch release signal from the transmission switch control 200 to the converter 500. The common switch release initiator 280 comprises OR gate 281 and amplifier 282. The output of this common switch release initiator 280 appears at point L and will be a "0" signal.

The last circuit component of the transmitter switch control 200, i.e., the transmitter and receiver switch initiator 320, controls the switching action in both the transmitter switch 20 and the receiver switch 120. The transmitter and receiver switch initiator 320 has an input from the output of working channel voter circuit 230 and from the output of switch hold circuit 260. The input to switch initiator 320 from switch hold circuit 260 is applied simultaneously to AND gate 321, delay circuit 322 and inverter 323. Because of the delay circuit 322, this signal will appear at the input to AND gate 321 before it will appear at the input to AND gate 324. The other input to the switch initiator 320 from the voter circuit 230 will be applied simultaneously to inhibitors 325 and 326 and inverter 327. If there is not an inhibit signal on inhibitors 325 and 326, the signal thus applied will travel therethrough and appear as inputs to AND gates 321 and 324. At this time AND gate 321 has an input signal on both input terminals before AND gate 324 has both input signals; and will therefore have an output before AND gate 324 has an output. The output of AND gate 321 will appear at point M and as inhibit signal on inhibitor 326.

If the output of AND gate 321 is a "1" signal, the inhibitor 326 will be inhibited and the signal on its input terminal will no longer flow therethrough. Since the signal is inhibited by inhibitor 326, there will not be an input to AND gate 324 from this inhibitor 326. Therefore, by the time the signal passes through delay circuit 322 and appears as an input to AND gate 324, the other input to AND gate 324 will have been removed and this AND gate will therefore not have an output which normally appears at point N.

It is therefore seen that by the delaying of the signal applied to AND gate 324 with respect to the signal applied to the AND gate 321 there can be an output from AND gate 321, before there is an output from AND gate 324. The output of AND gate 321 of working channel 1, for example, appears as an input to transmitter switch 20 and also as an input to converter 500, which will send a signal to the receiver switch control 400 to control the switching action in the receiver switch 120. By the inhibit feature in switch initiator 320 and by the delaying of the signal by delay circuit 322, a working channel will be assigned to a certain protection channel in preference to the other protection channel.

In the case assumed where all of the working channels and protection channels are functioning properly and the auxiliary circuitry is also functioning properly, there will be a "0" signal appearing at the input to switch initiator 320 from the output of working channel voter circuit 230. This "0" signal will appear as inputs to inhibitors 325 and 326 and will pass therethrough appearing as a "0" signal input to AND gates 321 and 324. With a "0" input on AND gates 321 and 324, there will be a "0" output from AND gate 321 appearing at point M and a "0" output from AND gate 324 appearing at point N. With a "0" appearing at these points there will be no switching action in either transmitter switch 20 or receiver switch 120.

*Case 2*

The condition now to be considered is labeled case 2 in table 1. The condition to be assumed is that all of the working channels and protection channels and their associated equipment are functioning properly, but there is a malfunction in the auxiliary circuitry so that all eight status signals are removed from the input to transmitter switch control 200. This will indicate the condition in transmitter switch control 200 of a failure on all working channels so that at points A1 through A6 at the output of memory circuit 210 in the working channels there will appear a "1" signal. At points A7 and A8 at the output of memory circuit 210 in the protection channels 7 and 8 there will appear a "0" signal.

The "0" signal now appearing at points A7 and A8 will make the output of AND gate 291 a "0," which will appear at point B. With a "0" at point B and a "1" at points A1 through A6, the output of protection circuit 250 appearing at point C1 through C6 of working channels 1 through 6, respectively, will remain a "1" signal.

Also the "0" signal appearing at points A7 and A8 will make the output of AND-NOT gate 292 a "0" which will, after passing through delay circuit 295 and inverter 296, appear as a "1" signal at point D.

At points E7 and E8 there will appear a "0" signal since the output of OR gate 301 and 302, respectively, will be a "0" because all inputs to these OR gates are "0" signals. With a "0" appearing at point E7, the output of each input gate 220 of working channels 1, 2 and 3, will be a "0" which will appear at points F1 through F3, respectively. Similarly, with a "0" appearing at point E8, the output of each input gate 220 in working channels 4 through 6 will be a "0" which will appear at points F4 through F6, respectively. The "0" input signal to working channel voter circuit 230 of working channels 1 through 6, appearing at points F1 through F6, respectively, will cause the output of voter circuit 230, appearing at points G1 through G6, respectively, to be a "0" signal.

The "0" signal output from voter circuit 230 will make the output of the transmitter and receiver switch initiator 320 a "0" signal which appears at points M1 through M6, respectively, and N1 through N6, respectively; and, therefore, no switches will be made.

In the switch hold circuit 260, the signal at points H1 through H6 of working channels 1 through 6, respectively, will remain a "0" which will make the signal appearing at points J1 through J6 a "1." This "1" signal appearing at points J1 through J6 will continue to inhibit inhibitor 264 in the switch hold circuit 260 of working channels 1 through 6, respectively. With a "0" signal appearing at points H1 through H6, AND gate 272 in switch release initiator 270 will have a "0" signal output, which will appear at points K1 through K6. The "0" signal appearing at points K1 through K6 will appear on the inputs to OR gate 281 of the common switch release initiator 280 and will produce a "0" signal output at point L which indicates that no switch release is to be made.

*Case 3*

The condition next considered in the table is case 3 where working channel 1 fails and protection channel 7 is assigned thereto.

Assuming that the failure of working channel 1 occurs between the last radio repeater in the system and the receiver terminal, channel monitor 90 in FIG. 4 will first detect the failure. The signal appearing across the transformer 95 is therefore assumed to be below a satisfactory level. This signal, after rectification by diodes 96 and 97 and smoothing by capacitor 98, will appear between the base and emitter electrodes of transistor 99. With this signal appearing between the base and emitter of transmitter 99 now below a certain level, transistor 99 will cease conduction and the current through the winding of relay 802 will cease to flow, de-energizing this relay. The contact of relay 802 will move to its left-hand position making contact with resistor 808. The bandpass filter 805 will now be coupled to ground through resistor 808. Therefore, the tone associated with working channel 1 will be dissipated in resistor 808 and will no longer be transmitted to the transmitter switch control 200.

The absence of this tone at converter 600 will be detected and the output of the detector 604 associated with working channel 1 will therefore be a "0." This "0" will appear as an input to memory circuit 210 of working channel 1 in the transmitter switch control 200 causing the output of memory circuit 210 to be a "1" indicating the failure of working channel 1 and the request for a switch to a protection channel. This output of memory circuit 210 will appear at point A1 as a "1" signal.

Since it is herein assumed that working channels 2 through 6 and the protection channels are functioning properly, the signal at point A6 will be a "0" and the signals at points A7 and A8 will be a "1." The "1" signals appearing at both points, A7 and A8 will cause a "1" signal to appear at point B as the output of AND gate 291. A "1" signal will also appear at point D at the output of inverter 296.

In working channel 1 the protection circuit 250 will have a "0" signal output appearing at C1 because the input on both its terminals will now be a "1" signal. The signal appearing at points C1 through C6, however, will remain a "1" since one input terminal of protection circuit 250 in working channels 2 through 6 has a "1" signal and the other input terminal has a "0" signal.

A "1" signal will appear at points E7 and E8 since both protection channels are in working order. Therefore, a "1" signal appearing at both points E7 and A1 and at the third input to input gate 220 of working channel 1 from channel monitor 10 will cause a "1" signal output from this gate 220 to appear at point F1.

The "1" signal output at point F1 will appear as an input to the working channel voter circuit 230 of channel 1. This "1" signal will have a path through AND gate 231 and also a path through AND gates 232 through 239, as these gates have become operative, by a "1" signal appearing at point D. With a "1" signal appearing at point F1 and a path for this signal to OR gate 240, this OR gate will have a "1" signal input and a "1" signal output.

The "1" signal output of OR gate 240 and of voter circuit 230 will appear at point G1 and as an input to switch hold circuit 260. This "1" signal input to switch hold circuit 260 will be amplified by amplifier 261 passed through delay circuit 262 and will appear as an input to OR gate 263. With a "1" signal input to OR gate 263, the output of OR gate 263 will be a "1" appearing at point H1. With a "1" signal now at point H1, the output of inverter 265 will be a "0" which appears at point J1 and on the inhibit terminal of inhibitor 204, thereby removing the inhibiting of any signal from passing through inhibitor 264.

The changing of the signal at point J from a "1" signal to a "0" signal, when a working channel requests a switch, is used for a lockout feature in accordance with the invention. The AND gates of the working channel voter circuit 230 are provided with this lockout feature. Point J of each working channel is connected to the working channel voter circuit 230 of every other working channel. When a working channel requests a switch, the "0" signal appearing at point J of that working channel will be applied as an input to AND gate 231 of every other working channel. This "0" signal input will preclude a "1" signal appearing at point F of the working channel that is now requesting a switch from causing a "1" signal output of this AND gate 231 which is the signal path for a one-for-six protection system. Therefore, the signal at point F of the working channel requesting a switch will have to take the path through the AND gates comprising the two-for-six protection system if it is available.

For example, if working channel 6 has been previously switched to a protection channel, a "0" signal appears at point J6. Referring now to the working channel voter circuit 230 of working channel 1, it is seen that this "0" signal at point J6 will preclude a "1" signal from being passed through AND gate 231 of the one-for-six protection system and through AND gates 232 and 236 of the two-for-six protection system. It is seen, then, that if working channel 1 requests a switch, the "1" signal appearing at point F1 will only have the path through AND gates 233 and 237 to OR gate 240.

Another feature of the switching system is provided by the lockout signal that is fed back from each working channel to the working channel voter circuit 230 of every other working channel. That is, if two working channels have requested switches and have therefore been switched no other working channel can be switched. For example, if working channels 5 and 6 have been switched, a "0" signal will appear at both points J5 and J6. By considering the AND gates of the working channel voter circuit 230 of working channel 1, it is seen that there is no longer any path for a switch request signal through this circuitry; and, therefore, working channel 1 cannot be switched to a protection channel.

However, for the conditions herein under consideration, there will be a "1" signal at points J2 through J6 and the signal appearing at point F1 of working channel 1 can therefore take any path through its working channel voter circuit 230.

With working channel 1 requesting a switch, a "1" signal appears at the input to transmitter and receiver switch initiator 320 at points G1 and H1. The "1" signal on both inputs to this switch initiator 320 will cause a "1" signal to appear at point M1. This "1" signal at point M1 will cause a current to flow through relay winding 21 of working channel 1 causing arm 22 to make contact with contact 23, thereby bridging working channel 1 to protection channel 7. When relay 21 is energized, it will break the contact between contact 24 and arm 25 which is applying the protection channel IF carrier signal to protection channel 7. The arm 25 is mechanically connected to arm 26, making arm 26 move in concert with arm 25. When the arm 25 is moved away from contact 24, arm 26 will make contact with contact 27, thereby dissipating the protection channel IF carrier signal by applying it to load resistor 29.

The "1" signal appearing at point M1 in response to the request for a switch by working channel 1 to protection channel 7 will also be applied to relay 501 in converter 500. This will cause the tone associated with working channel 1 and protection channel 7 to be transmitted to the receiver switch control 400 where the tone will be passed by the band-pass filter 401 that is resonant to the frequency of the tone. The tone will be changed to a direct current by detector 404 and will thereafter be applied to transistor 405. This direct current will cause transistor 405 to conduct which will allow current to flow through relay 121 of working channel 1. The energization of relay 121 will transfer protection channel 7 for working channel 1 and will also remove load resistor 170 from the output of protection channel 7.

The conduction of transistor 405 will also set memory device 410 in preparation for any subsequent switch release request by the working channel as dictated by the transmitter switch control 200.

The "1" signal at point M1 will also set the memory device 329 in the transmitter and receiver switch initiator 320 in preparation for a switch release request by the working channel.

*Case 4*

The condition now considered is case 4 of the table wherein working channel 1 has been switched to protection channel 7 and there is a malfunctioning of the auxiliary circuit so that the status signal inputs to transmitter switch control 200 are not present.

The loss of the status signals at the input of the transmitter switch control 200 will cause the output of the memory circuit 210 in protection channels 7 and 8 to be a "0." These "0" signals will appear at the input of OR gates 301 and 302 thereby making the output of these OR gates "0" signals. The output of OR gates 301 and 302 appear at points E7 and E8, respectively, at the input of each input gate 220 of the working channels 1 through 6, respectively. When a "0" signal input appears on this input gate 220, the output will be a "0." The input gate 220 will therefore not permit a switch request signal from a working channel to be transmitted through the working channel voter circuit 230 to the switch initiator 320 to effect a switch.

The action of the input gate 220 makes a "0" signal appear at points G1 through G6 of working channels 1 through 6, respectively. The "0" signal at point G1 will be applied as an input to transmitter and receiver switch initiator 320 and will make the signal appearing at point M1 therein a "0." The switch that has been made from working channel 1 to protection channel 7 will not be released, however, until a "0" signal appears at the other input at point H1 to the transmitter and receiver switch initiator 320.

The signal at point H1 will remain a "1" when the status signals are removed because of the action of the protection circuit 250 and switch hold circuit 260. The protection circuit 250 will have a "1" signal input at point A1 and a "0" signal input at point B thereby making the output a "1" signal appearing at point C1. This "1" signal will be applied to inhibitor 264 in the switch hold circuit 260 of working channel 1. The signal that existed on the inhibit gate of inhibitor 264 and at point J1 was a "0" and therefore the "1" signal input to inhibitor 264 will be passed therethrough. This "1" signal will appear as the input to OR gate 263, which will continue to have a "1" signal output appearing at point H1 because of this new input. The "1" signal input to OR gate 263 from delay circuit 262 will remain until after the "1" signal input from inhibitor 264 appears as an input to OR gate 263. The reason for this is that the time of transmission for a signal from input gate 220 to the OR gate 263 is longer than the time of transmission for a signal from protection circuit 250 to OR gate 263 because of the delay circuit 262 in the path of the first signal. Therefore, the "0" signal at point G1 will reach OR gate 263 after the arrival of the "1" signal at point C1.

*Case 5*

The circuit returns to the conditions existing under case 3 of the table. Working channel 1 remains switched to protection channel 7.

*Case 6*

Case 6 of the table represents the condition wherein working channel 1 has requested a switch and has been switched to protection channel 7 and working channel 6 subsequently fails and requests a switch.

The channel monitors and reporter circuits of working channel 6 will act similarly to those of working channel 1 to inform the transmitter switch control 200 of the failure of working channel 6 and of a request for a switch thereby.

All inputs to input gate 220 in working channels 1 and 6 are now a "1" signal thereby making the output of input gate 220 appearing at points F1 and F6, respectively, a "1."

In the working channel voter circuit 230 of working channel 6 there will be a "0" signal at all points labeled J1. This is true because working channel 1 had previously failed and requested a switch thereby placing a "1" signal at point H1 which appears as a "0" signal at point J1. With a "0" signal at point J1 in the voter circuit 230, a signal input to this circuitry has only one path by which to reach the output of this circuitry. There will be a "1" signal at points J2 through J5 in the working channel voter circuit 230 since working channels 2 through 5 have not requested a switch and are functioning properly. Therefore, the path that the signal input to voter circuit 230 of working channel 6 must take is through AND gate 232 and AND gate 235 to reach OR gate 240. With a "1" signal input to OR gate 240 there will be a "1" signal output appearing at point G6 and as an input to switch hold circuit 260.

The "1" signal input to switch hold circuit 260 of working channel 6 from the voter circuit 230 will appear at point H6. This "1" signal at point H6 will be changed by inverter 265 to a "0" signal which will appear at point J6 and on the inhibit terminal of inhibitor 264.

The "0" signal now appearing at points J1 and J6 when applied as lockout signals in the working channel voter circuit 230 of working channels 2 through 5 will preclude any switch request by any one of the remaining channels from being passed through its associated voter circuit 230. Therefore none of the remaining channels can be switched.

The "1" signal at point F1 in working channel 1, at the input to voter circuit 230, will now have to take the path through AND gates 233 and 237 because of the lockout signal on point J6.

The "1" signal now appearing at point H6 and point G6 will appear at the inputs to transmitter and receiver switch initiator 320. The signal appearing at point H6 will appear as an input to AND gate 321 and delay circuit 322. This signal will be delayed as an input to AND gate 324 so that the signal may pass through AND gate 321 before it is able to pass through AND gate 324. With a "1" signal at point G6, the output of inhibitor 325 will be a "1" appearing as an input to AND gate 321. The output of AND gate 321 appearing at point M6 will therefore be a "1" signal which will be coupled to inhibitor 326 so that no signal can pass therethrough. Therefore, one input to AND gate 324 will be a "0" which will thereby cause the output of AND gate 324 to be a "0" appearing at point N6. With a "1" signal at point M6, relay winding 31 in working channel 6 will be energized, thereby moving arm 22 to the right so that it makes contact with contact 32. The energization of relay winding 31 will also cause arm 33 to move to the left breaking contact with contact 34, thereby removing the carrier signal of signal supply 150 from protection channel 8. Arm 33 is mechanically connected to arm 35 thereby causing arm 35 to move in concert with arm 33. When arm 33 moves to the left by the energization of relay winding 31, arm 35 will also move to the left making contact with contact 36 which will cause the I.F. carrier supply 150 for protection channel 8 to now be dissipated in resistor 37.

*Case 7*

Case 7 of the table represents the condition wherein working channels 1 and 6 have been switched to protection channels 7 and 8, respectively, and there is a subsequent loss of all status tones.

The switches that have been made will not be released upon the loss of these status tones because of the action of the protection circuit 250 and switch hold circuit 260 in working channels 1 and 6, respectively, as discussed in case 4 wherein only working channel 1 had been switched to a protection channel.

*Case 8*

Case 8 of the table represents the condition where working channel 1 becomes good and working channel 6 remains in a condition requiring the continuance of the substitution of protection channel 8 for this working channel. The auxiliary circuitry is functioning properly so that a true indication of the condition of the channels is received at the input to transmitter switch control 200.

The signal level in channel monitor 90 of working channel 1 is increased thereby indicating that the working channel is again functioning properly. When this signal level increases, the input level in coupling circuit 95 will also increase. This increased signal level will appear at the input of transistor 99 and will allow this transistor to conduct again causing a current to flow through the winding of relay 802 associated with working channel 1. When this relay again becomes energized, the arm will be moved to its right-hand position so that the tone of working channel 1 will be transmitted to transmitter switch control 200.

This tone, upon entering converter 600, will be passed by the proper band-pass filter 601 and will then be detected by detector 604 which will send a direct-current signal to the input of memory circuit 210 in working channel 1 in the transmitter switch control 200. The output of memory circuit 210 in working channel 1 appearing at point A1 will now be a "0."

With working channel 6 still requiring the substitution of protection channel 8, the output of memory circuit 210 in working channel 6 appearing at point A6 will remain a "1" signal.

The output of memory circuit 210 in protection channels 7 and 8 appearing at points A7 and A8, respectively, will be a "1" signal indicating that protection channels 7 and 8 are functioning properly. With a "1" signal appearing at points A7 and A8, a "1" signal will appear at point B, the output of AND gate 291, and at point D, the output of inverter 296. With this "1" signal appearing at points A7 and A8, a "1" signal will also appear at points E7 and E8 at the output of OR gates 301 and 302, respectively.

The input to protection circuit 250 will be a "0" from point A1 and a "1" from point B, thereby making the output appearing at point C1 a "1." This output will be an input to switch hold circuit 260 and will be transmitted through inhibitor 264 to the input of OR gate 263. The output of OR gate 263 will therefore be a "1" appearing at point H1. This "1" signal appearing at point H1 will prevent the release of the bridging switch in the transmitter switch 20. This switch will be held until the acknowledgment of the reception of the switch release signal is received from the receiver switch control 400 which will remove the "1" signal at point H1.

In working channel 1 a "0" signal input to input gate 220 from memory circuit 210 will result in a "0" signal output appearing at point F1 and as an input to voter circuit 230. With a "0" signal input to voter circuit 230, the output of this circuitry will be a "0" signal appearing at point G1 and as an input to switch hold circuit 260.

In the transmitter and receiver switch initiator 320 of working channel 1, the input at point G1 is now a "0"

while the input at point H1 remains a "1." The signal at point M1 will be a "0" because of the "0" signal input at point G1 indicating that working channel 1 is no longer requesting a switch. The switch that has been made to protection channel 7 will not be released by the loss of this signal at point M1, however, because the residual magnetism of polarized relay 21 is holding arm 22 against contact 23 of working channel 1 in transmitter switch 20. Relay 30 of working channel 1 will not be energized to cause the release of this switch until there is a "1" signal output from AND gate 331 or until there is a "0" signal at both points G1 and H1.

The "0" signal at point G1 will be changed to a "1" signal by inverter 327 and will appear as an input to AND gate 331. Another input to AND gate 331 from memory device 329 which has been previously set by a "1" signal at point M1 will therefore be a "1." However, the "1" signal that remains at point H1 will be changed to a "0" signal by inverter 323 and will thereafter appear as the third input to AND gate 331. This "0" signal will therefore prevent AND gate 331 from having a "1" signal output and causing the release of the bridging switch in working channel 1. It is therefore apparent that before a switch will be released, the signal at both points G and H of the respective channels must be a "0."

The change from a "1" signal to a "0" signal at point M1 in the present case will be transmitted to receiver switch control 400 through converter 500. The winding of relay 501 associated with working channel 1 which had been energized by the "1" signal at point M1 will now be de-energized by the "0" signal at point M1. The de-energization of the winding of relay 501 will cause the arm of this relay to return to the right-hand position so that the tone generator 503 associated with working channel 1 and protection channel 7 will be coupled to ground through resistor 507. The removal of this tone from the receiver switch control 400 will cause the detector 404, which is associated with working channel 1 and protection channel 7, to have a "0" signal output. This "0" signal output will appear at the input to transistor 405 and will cause this transistor to cease conduction.

The current through relay 121 of working channel 1 will therefore be interrupted. However, the switch will remain until relay 130 is energized by a "1" signal output from AND gate 411. This "1" signal will not appear until the switch release request is received by the receiver switch control 400 from the transmitter switch control 200.

This switch release signal will be sent from the transmitter switch control 200 to the receiver switch control 400 at this time as follows: A "1" signal at point H1 in working channel 1 appears as an input to AND gate 272 in the switch release initiator 270. The "0" signal from the output of memory circuit 210 of working channel 1 will also appear as a "1" signal input to AND gate 272 after inversion by inverter 271. With both inputs to AND gate 272 now a "1" signal the output of this AND gate will be a "1" appearing at point K1. OR gate 281 in the common switch release initiator 280 will have a "1" output because the "1" input on its terminal K1. The "1" output of OR gate 281 will be amplified by amplifier 282 and will appear as a "1" at point L. This "1" signal output of switch release initiator 280 will be conductively coupled to converter 500 where it will energize relay 512. The energization of relay 512 will cause the arm of this relay to be moved to its left-hand position to make contact with the left-hand contact. The output of switch release tone generator 515 will now be applied to conductor 502 for transmission to the receiver switch control 400.

The presence of this switch release tone at the receiver switch control 400 will be detected by detector 415 after being passed by the band-pass filter 401 that is resonant at the frequency of the switch release signal. The direct-current output of detector 415 will be applied as an input to AND gates 411 associated with working channels 1 through 6.

However, only AND gate 411 associated with working channel 1 and protection channel 7 will have a "1" signal output at this time, since it is the only one having the required "1" signal on all of its inputs. The previous switch request signal caused transistor 405 to conduct, thereby setting memory device 410 so that it now has a "1" signal output. The only other memory device 410 that has a "1" signal output is the one associated with working channel 6 and protection channel 8 since working channel 6 is presently switched to protection channel 8.

However, AND gate 411 associated with working channel 6 and protection channel 8 will not have a "1" signal output at this time because its input from inverter 406 is a "0" as working channel 6 still requires the substitution of protection channel 8 and has a switch request signal output from its detector 404 appearing at the input to inverter 406.

The output of AND gate 411 associated with working channel 1 and protection channel 7 will be applied to relay winding 130 in receiver switch 120 to cause the release of the switch previously made. The output of this AND gate 411 will be of duration only long enough for relay 130 in working channel 1 to cause the release of the switch. The "1" signal output is coupled to the *b* terminal input of memory device 410 through delay circuit 412. Delay circuit 412 delays the passage of this signal until relay 130 has been able to operate. The "1" signal input on the *b* terminal of memory device 410 will reset this device causing it to have a "0" signal output. This "0" signal output will thereafter cause AND gate 411 to have a "0" signal output. This action makes this circuitry ready for the next switch request.

Before the "1" signal output of the AND gate 411 is removed, it appears as an input to OR gate 427. The OR gate 427 will therefore have a "1" signal output of short duration which will be coupled to the tone generator 700. This "1" signal will energize relay 727 causing the momentary removal of the tone associated with protection channel 7. The action of the transmitter switch control 200 in accordance with the removal of this tone is discussed in case 8*a*, infra.

*Case 8a*

Case 8*a* of the table represents the condition subsequent to the action taken by the system in case 8 wherein working channel 6 requires the continuance of the substitution of protection channel 8 and working channel 1 had subsequently begun to function properly and was requesting a switch release. The transmitter switch control 200 has been made ready for the acknowledgment from the receiver switch control 400 of the reception of and the action upon the switch release signal from the transmitter switch control 200. This acknowledgment is made by a momentary removal from the status signals of the tone associated with the protection channel that is being released.

The tone associated with protection channel 7 has been removed from the status signals and the output of detector 604 associated with protection channel 7 is now a "0." The output of memory circuit 210 in protection channel 7, therefore, will now be a "0" signal which appears at point A7 indicating the removal of the tone. With a "0" signal appearing at point A7 the output of AND gate 291 appearing at point B will now be a "0."

There is a "0" signal now appearing at point A1 because working channel 1 is functioning properly and a "0" signal at point B as discussed above. The output of protection circuit 250 appearing at point C1 therefore will be a "0" signal. This change of a "1" signal to a "0" signal at point C1 and the remaining of a "0" signal at point F1 and point G1 will result in both inputs to OR gate 263 in switch hold circuit 260 being a "0" signal. Therefore, the output of OR gate 263 appearing at point H1 will now be a "0."

The "0" signals at points G1 and H1 will appear at the input to transmitter and receiver switch initiator 320 in working channel 1 causing the signal at points M1 and N1 to be a "0." Since there has been prior to this time a "1" signal at point M1 and at the input terminal *a* of memory device 329, the output of this memory device will be a "1." The "0" signal at point H1 will be changed to a "1" by inverter 323 and applied to the input of AND gates 331 and 332. The "0" signal at point G1 will be changed to a "1" signal by inverter 327 and applied to the input of AND gates 331 and 332. Only AND gate 331, however, will have a "1" output because only memory device 329 has been set by the application of a "1" signal at its *a* terminal input. The "1" signal output of AND gate 331 will energize relay winding 30 of working channel 1 in transmitter switch 20 causing the release of arm 22 from the residual magnetism of polarized relay 21.

This "1" signal output will be of duration only long enough for this relay 30 to release the previously made switch. This "1" signal is coupled through delay circuit 333 to the *b* input terminal of memory device 329 wherein it will reset this device to now have a "0" signal output. The "0" signal output of memory device 329 will appear as an input to AND gate 331 causing the output of this AND gate to become a "0" and preparing the circuitry for any subsequent switching action.

*Case 9*

Case 9 is similar to case 8 of the table where now working channel 6 requests the switch release rather than working channel 1. The action of the transmitter switch control and the other components of the auxiliary circuit is similar to the actions as described in case 8.

*Case 9a*

Case 9*a* corresponds to case 8*a* where now protection channel 8 status tone is momentarily removed to acknowledge to the transmitter switch control 200 the reception and the action thereupon of the switch release signal by the receiver switch control 400.

*Case 10*

Case 10 represents the conditions wherein the switching section has gone through the condition of cases 3 through 9*a* and is now in the condition of normal operation.

*Case 11*

Case 11 of the table represents the condition where working channel 1 requests a switch to a protection channel but cannot be switched to protection channel 7 because protection channel 7 is not functioning properly and has been removed from service.

The malfunctioning of protection channel 7 will produce a "0" signal at point A7 at the output of memory circuit 210 associated with protection channel 7. This protection channel will be removed from service by the application of this "0" signal appearing at point A7 to inverter 305. The inverter 305 will change this "0" signal to a "1" signal which will subsequently be applied to OR gate 328 in working channels 1, 2 and 3, respectively, and to OR gate 335 in working channels 4, 5 and 6, respectively, in each of the transmitter and receiver switch initiators 320 of the working channels 1 through 6. The application of this "1" signal on OR gate 328 will produce a "1" signal output from this OR gate which will be applied to the inhibit terminal of inhibitor 325 thus precluding any signal from passing therethrough. Therefore, a "1" signal cannot exist at the output of AND gate 321 because of the action of the inhibitor 325, thereby preventing a switch to protection channel 7 of working channels 1, 2 or 3.

The application of the "1" signal output from inverter 305 to OR gate 335 of the switch initiators 320 in working channels 4, 5 and 6 will preclude any of these working channels from being switched to protection channel 7. The "1" signal on OR gate 335 will produce a "1" signal output from this OR gate which will be applied to the inhibit terminal of inhibitor 326 thereby preventing any signal from flowing therethrough. The output of AND gate 324 will therefore be a "0" because of the action of inhibitor 326 thereby precluding any switching signal from appearing at point N in the switch initiators 320 of working channels 4, 5 and 6. Since a signal cannot appear at this point for any of these working channels, none of these working channels can be switched to protection channel 7.

Working channel 1, in requesting a switch to a protection channel, will have a "1" signal appearing at points G1 and H1 at the input of its transmitter and receiver switch initiator 320. These "1" signals will be applied to inhibitors 325 and 326 and AND gate 321 and delay circuit 322. As above described, inhibitor 325 is inhibited and the "1" signal cannot flow therethrough. However, the "1" signal can flow through inhibitor 326 and will appear at the input to AND gate 324. The other input to AND gate 324 will have a "1" signal from point H1 after a proper interval of delay by delay circuit 322. AND gate 324 will therefore have a "1" signal output appearing at N1, which will be applied to the transmitter switch 20 and the receiver switch control 400 through converter 500 to effect a switch to protection channel 8.

The failure of protection channel 7 will cause a "0" signal to appear at point D at the input to working channel voter circuit 230 of working channels 1 through 6. A "0" input at this point will disable the two-for-six protection system of the voter circuit 230 and will allow only a signal passing through the voter circuit 230 to take the path of the one-for-six protection system through AND gate 231. This path through AND gate 231 will not be available for a signal in any of the working channels other than working channel 1 because of the lockout signal that will be fed back from the switch hold circuit 260 in working channel 1 to the voter circuits 230 of working channels 2 through 6, respectively.

*Case 12*

Case 12 of the table represents the condition where working channel 2 has been switched to protection channel 7 and working channel 1 now requests a switch.

The switch request signal from the output of memory circuit 210 of working channel 1 which is now a "1" signal will be required to take the path through its working channel voter circuit 230 through AND gates 232 and 235 to OR gate 240. The reason that the switch request signal is restricted to this path is that when working channel 2 had requested a switch and was switched to protection channel 7 a lockout signal from its switch hold circuit 260 was fed back to the working channel voter circuit 230 of working channel 1 and disabled the AND gates in the other paths through the voter circuit 230.

The switch request signal of working channel 1 will appear as a "1" signal at points G1 and H1 at the inputs of the transmitter and receiver switch initiator 320 of working channel 1. The switch request signal appearing at G1 will not be able to take the path through inhibitor 325 to point M1 to effect a switch to protection channel 7 because the switch initiator 320 of working channel 2 which has already been switched to protection channel 7 will have a "1" signal from its point M2 coupled to the OR gate 328 in the switch initiator 320 of working channel 1. This "1" input to OR gate 28 will make the output of this OR gate a "1" signal appearing on the inhibit terminal of inhibitor 325 thereby preventing any signal from flowing therethrough.

Therefore, the "1" signal inputs appearing at points G1 and H1 must take the path through inhibitor 326 to AND gate 324 and the path through delay circuit 322 to AND gate 324, respectively, to effect a switch from working channel 1 to a protection channel. AND gate 324 will therefore have a "1" signal output appearing at point N1 which will effect a switch to protection channel 8 from working channel 1.

What is claimed is:

1. In a communication system, a transmitting and a receiving station, a plurality of information carrying channels linking said stations, a plurality of spare channels also linking said stations, means at each of said stations for substituting a first one of said spare channels for a failed information carrying channel, means at said receiving station for detecting the failure of an information carrying channel, means at the transmitting station responsive to said detecting means for effecting the operation of said substituting means and for precluding the simultaneous substitution of another spare channel for said failed channel, and means at said transmitting station for allowing the automatic substitution of another one of said spare channels for an information carrying channel when said first one of said spare channels is unavailable.

2. In a microwave radio relay system including a transmitter terminal, a receiver terminal and a plurality of radio repeaters therebetween, the combination comprising a plurality of working channels and a plurality of protection channels linking said transmitter terminal to said receiver terminal through said radio repeaters, means at said transmitter terminal for bridging any working channel to any protection channel, means at said receiver terminal for transferring any working channel to any protection channel, means at said receiver terminal and at said repeaters for evaluating the energy level of the signal transmitted over said working channels and protection channels to detect any failure of said channels, means associated with and responsive to said evaluating means for reporting the condition of said channels, and means at said transmitter terminal responsive to said reporting means for controlling said bridging means and said transferring means in accordance with the condition of said channels.

3. In a communication system including a transmitting station and a receiving station, a plurality of working channels linking said stations, a plurality of spare channels also linking said stations, means at each of said stations for substituting any one of said spare channels for any one of said working channels, means at said receiving station for detecting the failure of a working channel, and means at said transmitting station for causing the operation of said substituting means in response to said detecting means.

4. A communication system in accordance with claim 3 including means for assigning a group of said working channels to one particular spare channel so that a failed working channel of said group will be preferentially substituted for by said one particular spare channel with respect to the working spare channels.

5. A communication system in accordance with claim 3 including a first precluding means at said transmitting station for precluding the concurrent substitution of a second spare channel for a failed working channel which has already been substituted for by a first spare channel.

6. A communication system in accordance with claim 3 including a second means for precluding the release of any substitutions already effective when said detecting means informs said first means of a failure of all working channels and all spare channels.

7. A communication system in accordance with claim 6 wherein said second means also precludes the release of any substitutions already made when said detecting means informs said first means of a failure of all of said spare channels except those substituting for a working channel.

8. In a communication system including a transmitting station and a receiving station, the combination comprising a plurality of working channels linking said stations, a plurality of spare chanels also linking said stations, a first substituting means at said transmitting station for bridging any one of said working channels to any one of said spare channels, second substituting means at said receiving station for transferring any one of said working channels to any one of said spare channels, means at said receiving station for detecting the failure of any one of said channels, tone generators associated with each channel located at said receiving station, means for transmitting said tones to said transmitting station, means responsive to said detecting means for controlling the presence on said tone transmitting means of a tone associated with each particular channel, and means at said transmitting station responsive to a transmitted tone for effecting the operation of said substituting means.

9. In a microwave radio relay system including a transmitter terminal, a receiver terminal and a plurality of radio repeaters therebetween, the combination comprising a plurality of working channels linking said terminals through said radio repeaters, at least two spare channels also linking said terminals through said radio repeaters, means at each of said terminals and at each radio repeater for monitoring the energy level of the signal transmitted on each of said channels, means at said receiver terminal for generating a tone associated with each of said channels, means for transmitting said tones to said transmitter terminal, means located and associated with each of said monitoring means for removing the tone associated with a channel so that the absence of said tone at said transmitting terminal is indicative of a failed condition of the channel, and means at said transmitter terminal responsive to the absence of said tone for effecting the substitution of a spare channel for said failed working channel.

10. In a broadband radio system, a transmitting terminal, a receiving terminal, a plurality of message channels linking said terminals, first and second spare channels also linking said terminals, means for detecting the failure of any of said message channels, first means normally effective to substitute the first spare channel for any failed message channel in a first group of said message channels, and second means normally effective to substitute the second spare channel for any failed message channel of the remaining group of message channels.

11. In a broadband radio system, a transmitting terminal, a receiving terminal, a plurality of message channels linking said terminals, first and second spare channels also linking said terminals, means for detecting the failure of any of said channels, first means normally effective to substitute the first spare channel for any failed message channel in a first group of said message channels, second means normally effective for substituting the second spare channel for any other failed message channel, and means acting to override said first and second substituting means when either the first or second spare channel fails to permit the substitution of the remaining spare channel for any failed message channel.

12. In a broadband radio system, a transmitting station, a receiving station, a plurality of repeater stations, a plurality of message channels and at least one spare channel linking the transmitting and receiving stations by way of said repeater stations, means at each of said stations to detect signal failure in any of the channels reaching the respective stations, means responsive to said detecting means at other than a transmitting station for substituting a spare channel for a failed message channel, and means responsive to said detecting means at a transmitting station to prevent substitution of a spare channel for a message channel leaving said station even though a detecting means at a subsequent station indicates a failure in that message channel.

13. In a broadband radio relay system, a transmitting station, a receiving station, *m* message channels linking said stations, two spare channels also linking said stations, means for detecting failures in any of said message channels, means responsive to said detecting means for substituting said spare channels for the first two failed message channels on a two for *m* basis, means for identifying a failure of a spare channel, and means responsive to said identifying means for modifying the action of said substituting means to substitute the remaining spare channel for the first failed message channel on a one for *m* basis.

14. In a communication system including a transmitting station and a receiving station, a plurality of working channels linking said stations, a plurality of spare channels also linking said stations, means at each of said stations for substituting any one of said spare channels for any one of said working channels, means at said receiving station for detecting the failure of a working channel, means at said transmitting station for causing the operation of said substituting means in response to said detecting means, and means at said transmitting station for precluding the substitution for any working channel that fails when all of the spare channels are unavailable.

References Cited in the file of this patent

UNITED STATES PATENTS

| | | |
|---|---|---|
| 2,229,108 | Maggio et al. | Jan. 21, 1941 |
| 2,379,069 | Dysart | June 26, 1945 |
| 2,680,162 | Brehm et al. | June 1, 1954 |
| 2,686,256 | Albersheim | Aug. 10, 1954 |
| 3,045,185 | Mathwick | July 17, 1962 |